US012600294B2

(12) United States Patent
Maiorana et al.

(10) Patent No.: US 12,600,294 B2
(45) Date of Patent: *Apr. 14, 2026

(54) TANKER TRUCK WITH REAR LIGHTING ASSEMBLY AND METHOD OF OPERATION

(71) Applicant: Mac LTT, Inc., Kent, OH (US)

(72) Inventors: James A. Maiorana, Hartville, OH (US); Anthony Scott Miller, Elyria, OH (US); Ryan Joseph Troyer, Hartville, OH (US)

(73) Assignee: Mac LTT, Inc., Kent, OH (US)

( * ) Notice: Subject to any disclaimer, the term of this patent is extended or adjusted under 35 U.S.C. 154(b) by 363 days.

This patent is subject to a terminal disclaimer.

(21) Appl. No.: 18/333,665

(22) Filed: Jun. 13, 2023

(65) Prior Publication Data

US 2024/0416827 A1    Dec. 19, 2024

(51) Int. Cl.
*B60Q 1/34* (2006.01)
*B60P 3/22* (2006.01)
*B60Q 1/44* (2006.01)
*B60Q 1/46* (2006.01)

(52) U.S. Cl.
CPC .............. *B60Q 1/34* (2013.01); *B60P 3/2205* (2013.01); *B60Q 1/44* (2013.01); *B60Q 1/46* (2013.01)

(58) Field of Classification Search
CPC ... B60Q 1/34; B60Q 1/44; B60Q 1/46; B60Q 1/543; B60P 3/2205
USPC .......................................................... 701/70
See application file for complete search history.

(56) References Cited

U.S. PATENT DOCUMENTS

| | | | |
|---|---|---|---|
| 1,594,464 A | 8/1926 | Lightner | |
| 2,033,457 A | 3/1936 | Davis, Jr. | |
| 2,340,628 A | 2/1944 | Theriault | |
| 3,796,457 A | 3/1974 | Hinchliff | |
| 3,995,871 A | 12/1976 | Vomberger | |
| 4,018,354 A | 4/1977 | Lawler | |
| 4,458,936 A | 7/1984 | Mulholland | |
| 4,627,629 A | 12/1986 | O'Neill | |
| 5,688,036 A | 11/1997 | Marshall | |
| 5,911,337 A | 6/1999 | Bedeker | |
| 6,133,851 A | 10/2000 | Johnson | |

(Continued)

OTHER PUBLICATIONS

Not yet published U.S. Appl. No. 17/586,871, filed Jan. 28, 2022, titled Trailer With Included Rear Bulkhead, Applicant—Mac LTT, Inc.

(Continued)

*Primary Examiner* — Hai H Huynh
(74) *Attorney, Agent, or Firm* — Sand, Sebolt & Wernow Co., LPA

(57) ABSTRACT

A method of signaling a plurality of driving states of a tank vehicle when in travel. The method includes steps of sending a travel response to a rear lighting assembly of the tank vehicle, emitting a set of indicating lights, by a signaling device of the rear lighting assembly, through a false bulkhead of the tank vehicle, and signaling the plurality of driving states of the tank vehicle when in travel. The method may further include that the step of emitting the set of indicating lights through the false bulkhead further includes that the set of indicating lights is transmitted through the false bulkhead free from obstructing a view of the signaling device or that the set of indicating lights is diffused through the false bulkhead to obstruct a view of the signaling device.

20 Claims, 17 Drawing Sheets

(56) References Cited

U.S. PATENT DOCUMENTS

| | | | |
|---|---|---|---|
| 6,666,498 B1 | 12/2003 | Whitten | |
| 8,025,329 B1 | 9/2011 | Kron | |
| 9,126,532 B2 | 9/2015 | Ichino | |
| 9,527,534 B2 | 12/2016 | Knobloch | |
| 9,616,799 B1 | 4/2017 | Smith | |
| 9,789,916 B1 | 10/2017 | Beelman, III | |
| 10,308,169 B1 | 6/2019 | Weedon | |
| 10,420,189 B2 | 9/2019 | Salter | |
| 10,946,907 B2 | 3/2021 | McQuilkin | |
| 11,104,270 B1 | 8/2021 | Timms | |
| 11,780,508 B1 | 10/2023 | Maiorana | |
| 2012/0048847 A1 | 3/2012 | Mino | |
| 2017/0253168 A1 | 9/2017 | Cannon | |
| 2017/0253170 A1 | 9/2017 | Neal | |
| 2023/0322155 A1* | 10/2023 | Maiorana | B60Q 1/305 |
| 2024/0416825 A1* | 12/2024 | Maiorana | B60Q 1/3015 |
| 2024/0416826 A1* | 12/2024 | Maiorana | B60Q 1/301 |
| 2025/0058704 A1* | 2/2025 | Maiorana | B60Q 1/38 |

OTHER PUBLICATIONS

Not yet published U.S. Appl. No. 17/586,890, filed Jan. 28, 2022, titled Trailer With Stainless Steel Bulkhead, Applicant—Mac LTT, Inc.

Not yet published U.S. Appl. No. 17/586,912, filed Jan. 28, 2022, titled Trailer Having Reduced Contamination, Applicant—Mac LTT, Inc.

* cited by examiner

100

102 — Sending a travel response to a rear lighting assembly of the tank vehicle

104 — Emitting a set of indicating lights, by a signaling device of the rear lighting assembly, through a false bulkhead of the tank vehicle 106 — Signaling the plurality of driving states of the tank vehicle when in travel

TANKER TRUCK WITH REAR LIGHTING ASSEMBLY AND METHOD OF OPERATION

TECHNICAL FIELD

The present disclosure is directed to tank trailers, particularly a rear lighting assembly for tank trailers.

BACKGROUND ART

Tank trailers, liquid tanker trailers, and other similar enclosed trailers serve essential purposes for transporting various types of goods and material, either in solid form, liquid form, or gaseous form, in large quantities. Since these tank trailers are designed to transport large quantities of material, these tank trailers normally have larger footprints and/or surface space as compared to other various types of vehicles on roadways. Given the length and width of these tank trailers, these tank tankers come with various driving obstacles and complications when safety transporting one or more particular goods or materials on roadways, including turning radii of tank trailers, lack of visibility about tank trailers, and other similar obstacles and complications of the like.

To combat against these driving obstacles and complication, conventional tank trailers, liquid tanker trailers, and other similar enclosed trailers include signaling lights to indicate to surrounding drivers and pedestrians driving states or directions of travel of these tank trailers when being towed by vehicles. However, even though signaling lights are beneficial for indicating the direction of travel for a tank trailer, these signaling lights are generally located at limited areas on the rear ends of these tank trailer that could limit visibility of signaling driving states or directions of travel of these tank trailers when being towed. In one instance, these signaling and/or indicating lights may only be placed at a single location at the rear ends of these tank trailers; such location of these signaling lights could be covered by surrounding vehicles physical obstructions placed on or near roadways. In another instance, these signaling lights may only be placed at outer or peripheral locations at the rear ends of these tank trailers; again, such location of these signaling and/or indicating lights could be covered by surrounding vehicles or physical obstructions placed on or near roadways. In yet another instance, these signaling lights may be covered by dirt, road debris, or precipitation given the location at which these lights are located on these tank trailers.

SUMMARY OF THE INVENTION

In one aspect, an exemplary embodiment of the present disclosure may provide a tank vehicle. Tank vehicle includes a main body that has a front bulkhead, a rear bulkhead opposite to the front bulkhead, an exterior wall operably engaged with the front bulkhead and the rear bulkhead, and at least one interior chamber defined collectively by the front bulkhead, the rear bulkhead, and the exterior wall, the at least one interior chamber being adapted to carry a load. Tank vehicle also includes a false bulkhead that is removably engaged with the main body, the false bulkhead being located a distance away from one of the front bulkhead and the rear bulkhead. Tank vehicle also includes a rear lighting assembly that operably engages with one of the rear bulkhead and the false bulkhead. The rear light assembly is configured to emit a set of indicator lights through a portion of the false bulkhead and behind the main body to indicate travel of the tank vehicle.

This exemplary embodiment or another exemplary embodiment may further include that the rear lighting assembly further comprises: at least one signaling device operably engaged with one of the rear bulkhead and the false bulkhead; wherein the at least one signaling device is configured to emit the set of indicator lights to indicate the travel of the tank vehicle. This exemplary embodiment or another exemplary embodiment may further include a first material forming the rear bulkhead; and a second material forming the false bulkhead and is different than the first material; wherein the first material is configured to reflect each indicator light of the set of indicator lights; and wherein the second material is configured to transmit each indicator light of the set of indicator lights. This exemplary embodiment or another exemplary embodiment may further include an extension wall operably engaged with the exterior wall and extending outwardly away from the rear bulkhead; wherein the at least one signaling device is located internal to the extension wall. This exemplary embodiment or another exemplary embodiment may further include that the extension wall comprises: a first end operably engaged with the exterior wall; a second end opposite to the first end and spaced apart from the exterior wall; wherein the false bulkhead is configured to operably engage with the extension wall at a distance away from the rear bulkhead. This exemplary embodiment or another exemplary embodiment may further include that the extension wall further comprises: an outer surface extending between the first end and the second end; and an inner surface extending between the first end and the second end that is opposite to the outer surface and in communication with the rear bulkhead; wherein the inner surface and the rear bulkhead collectively define a cavity that extends from the second end of the extension wall to the rear bulkhead for housing the at least one signaling device when the false bulkhead is removed. This exemplary embodiment or another exemplary embodiment may further include that the extension wall further comprises: an outer surface extending between the first end and the second end; and an inner surface extending between the first end and the second end that is opposite to the outer surface and in communication with the rear bulkhead; wherein the inner surface, the rear bulkhead, and the false bulkhead collectively define an exterior chamber for housing the at least one signaling device. This exemplary embodiment or another exemplary embodiment may further include that the rear lighting assembly further comprises: at least another signaling device operably engaged with the rear bulkhead that is spaced apart from the false bulkhead and adjacent to the at least one signaling device; wherein the at least another signaling device is configured to emit the set of indicator lights to indicate the travel of the tank vehicle. This exemplary embodiment or another exemplary embodiment may further include a divider operably engaged with the rear bulkhead and spaced apart from the false bulkhead; wherein the divider separates the at least one signaling device and the at least another signaling device from one another. This exemplary embodiment or another exemplary embodiment may further include a first material forming each of the rear bulkhead, the extension wall, and the divider; and a second material forming the false bulkhead that is different than the first material; wherein the first material is configured to reflect the set of indicator lights emitted by the at least one signaling device. This exemplary embodiment or another exemplary embodiment may further include that the divider comprises: a first end operably engaged with the rear bulkhead and a second end opposite to the first end and spaced apart from the rear bulkhead; a first side wall extending between the first end and the second end that faces towards a first portion of the inner surface of the extension wall; and a second side wall extending between the first end and the second end that faces towards a second portion of the inner surface of the extension wall; wherein the first side wall and the second side wall face in opposing directions. This exemplary embodiment or another exemplary embodiment may further include a first compartment collectively defined by the rear bulkhead, the inner surface of the extension wall, and the first side wall of the divider; and a second compartment collectively defined by the rear bulkhead, the inner surface of the extension wall, and the second side wall of the divider; wherein the at least one signal device is located inside of the first compartment and the at least another signal device is located inside of the second compartment. This exemplary embodiment or another exemplary embodiment may further include that the rear lighting assembly further comprises: a set of first auxiliary signaling devices operably engaged with at least one of the extension wall and the first side wall of the divider; wherein the set of first auxiliary signaling devices is positioned inside of the first compartment with the at least one signaling device. This exemplary embodiment or another exemplary embodiment may further include that the rear lighting assembly further comprises: a set of second auxiliary signaling devices operably engaged with at least one of the extension wall and the second side wall of the divider; wherein set of second auxiliary signaling devices is positioned inside of the second compartment with the at least another signaling device. This exemplary embodiment or another exemplary embodiment may further include a mounting wall extending inwardly from the inner surface of the extension wall at a location between the first end of the extension wall and the second end of the extension wall; wherein the extension wall and the mounting wall are configured to receive and operably engage with the false bulkhead. This exemplary embodiment or another exemplary embodiment may further include a first material forming each of the rear bulkhead, the extension wall, the divider, and the mounting wall; and a second material forming the false bulkhead that is different than the first material; wherein the first material is configured to reflect the set of indicator lights emitted by the at least one signaling device. This exemplary embodiment or another exemplary embodiment may further include that the mounting wall comprises: an exterior surface operably engaged with the false bulkhead; and an interior surface opposite to the exterior surface and spaced apart from the rear bulkhead. This exemplary embodiment or another exemplary embodiment may further include a recess defined by the second end of the extension wall and the mounting wall; wherein the false bulkhead is positioned entirely inside of the recess such that the false bulkhead is even with the second end of the extension wall. This exemplary embodiment or another exemplary embodiment may further include graphics provided on the false bulkhead; wherein the graphics are configured to be illuminated by the set of indicator lights emitted against the false bulkhead by the rear lighting assembly.

In another aspect, an exemplary embodiment of the present disclosure may provide a tank vehicle. Tank vehicle includes a main body that has a front bulkhead, an rear bulkhead opposite to the front bulkhead, an exterior wall operably engaged with the front and rear bulkheads, and at least one interior chamber defined collectively by the front bulkhead, the rear bulkhead, and the exterior wall, said at least one interior chamber being adapted to carry a load. Tank vehicle also includes a false bulkhead that is removably engaged with the main body, the false bulkhead being located a distance away from one of the front bulkhead and the rear bulkhead. Tank vehicle also includes a rear lighting assembly that is operably engaged with one of the rear bulkhead and the false bulkhead. Tank vehicle also includes a first material forming the rear bulkhead, and a second material forming the false bulkhead that is different than the first material. The first material is configured to reflect a set of indicator lights emitted by the rear lighting assembly, and the second material is configured to transmit the set of indicator lights emitted by the rear lighting assembly behind the main body.

In yet another aspect, an exemplary embodiment of the present disclosure may provide a method of signaling a plurality of driving states of a tank vehicle when in travel. The method includes steps of sending a travel response to a rear lighting assembly of the tank vehicle; emitting a set of indicating lights, by a signaling device of the rear lighting assembly, through a false bulkhead of the tank vehicle; and signaling the plurality of driving states of the tank vehicle when in travel.

This exemplary embodiment or another exemplary embodiment may further include that the step of emitting the set of indicating lights through the false bulkhead further includes that the set of indicating lights is transmitted through the false bulkhead free from obstructing a view of the signaling device. This exemplary embodiment or another exemplary embodiment may further include that the step of emitting the set of indicating lights through the false bulkhead further includes that the set of indicating lights is diffused through the false bulkhead to obstruct a view of the signaling device. This exemplary embodiment or another exemplary embodiment may further include a step of reflecting at least one indicating light of the set of indicating lights, by a rear bulkhead of the tank vehicle, towards the false bulkhead. This exemplary embodiment or another exemplary embodiment may further include steps of emitting a series of first turn indicating lights of the set of indicating lights, by the signaling device, through the false bulkhead; and signaling a first turning state of the plurality of driving states of the tank vehicle. This exemplary embodiment or another exemplary embodiment may further include steps of emitting a series of second turn indicating lights of the set of indicating lights, by the signaling device, through the false bulkhead; and signaling a second turning state of the plurality of driving states of the tank vehicle; wherein second turning state is opposite to the first turning state. This exemplary embodiment or another exemplary embodiment may further include steps of emitting a braking indicating light of the set of indicating lights, by the signaling device, through the false bulkhead of the tank vehicle; and signaling a braking state of the plurality of driving states of the tank vehicle when in travel. This exemplary embodiment or another exemplary embodiment may further include steps of emitting a reversing indicating light of the set of indicating lights, by the signaling device, through the false bulkhead of the tank vehicle; and signaling a reversing state of the plurality of driving states of the tank vehicle when in travel. This exemplary embodiment or another exemplary embodiment may further include steps of emitting a series of first turn indicating lights of the set of indicating lights, by the signaling device, through the false bulkhead; emitting a series of second turn indicating lights of the set of indicating lights, by the signaling device, through the false bulkhead; and signaling a hazard state of the plurality of driving states of the tank vehicle when in travel. This exemplary embodiment or another exemplary embodiment may further include steps of emitting a running indicating light of the set of indicating lights, by the signaling device, through the false bulkhead of the tank vehicle; and signaling a running state of the plurality of driving states of the tank vehicle when in travel.

In yet another aspect, an exemplary embodiment of the present disclosure may provide a method of signaling a plurality of driving states of a tank vehicle when in travel. The method includes steps of sending a travel response to a rear lighting assembly of the tank vehicle; emitting a set of indicating lights, by a pair of signaling devices of the rear lighting assembly, inside a first compartment of the tank vehicle or a second compartment; emitting the set of indicating lights, by the pair of signaling device of the rear lighting assembly, through a false bulkhead of the tank vehicle; and signaling the plurality of driving states of the tank vehicle when in travel.

This exemplary embodiment or another exemplary embodiment may further include steps of emitting a series of first turn indicating lights of the set of indicating lights, by a first signaling device of the pair of signaling devices, inside of the first compartment and through a first portion of the false bulkhead; and signaling a first turning state of the plurality of driving states of the tank vehicle. This exemplary embodiment or another exemplary embodiment may further include steps of emitting a series of second turn indicating lights of the set of indicating lights, by a second signaling device of the pair of signaling devices, inside of the second compartment and through a second portion of the false bulkhead; and signaling a second turning state of the plurality of driving states of the tank vehicle; wherein the second turning state is opposite to the first turning state. This exemplary embodiment or another exemplary embodiment may further include steps of emitting the series of first turn indicating lights of the set of indicating lights, by a set of first auxiliary signaling devices of the rear lighting assembly, inside of the first compartment and through the first portion of the false bulkhead; and signaling the first turning state of the plurality of driving states of the tank vehicle; wherein the series of first turn indicating lights is emitted simultaneously by the first signaling device and the set of first auxiliary signaling lights. This exemplary embodiment or another exemplary embodiment may further include steps of emitting the series of second turn indicating lights of the set of indicating lights, by a set of second auxiliary signaling devices of the rear lighting assembly, inside of the second compartment and through the second portion of the false bulkhead; and signaling the second turning state of the plurality of driving states of the tank vehicle; wherein the series of second turn indicating lights is emitted simultaneously by the second signaling device and the set of second auxiliary signaling lights. This exemplary embodiment or another exemplary embodiment may further include steps of emitting a first braking indicating light of the set of indicating lights, by a first signaling device of the pair of signaling devices, inside of the first compartment and through the false bulkhead of the tank vehicle; emitting a second braking indicating light of the set of indicating lights, by a second signaling device of the pair of signaling devices, inside of the second compartment and through the false bulkhead of the tank vehicle; and signaling a braking state of the plurality of driving states of the tank vehicle when in travel. This exemplary embodiment or another exemplary embodiment may further include steps of emitting the first braking indicating light of the set of indicating lights, by a set of first auxiliary signaling devices of the rear lighting assembly, inside of the first compartment and through the false bulkhead of the tank vehicle; emitting the second braking indicating light of the set of indicating lights, by a set of second peripheral signaling devices of the rear lighting assembly, inside of the second compartment and through the false bulkhead of the tank vehicle; and signaling the braking state of the plurality of driving states of the tank vehicle when in travel. This exemplary embodiment or another exemplary embodiment may further include that the step of emitting the set of indicating lights through the false bulkhead further includes that the set of indicating lights is transmitted through the false bulkhead free from obstructing a view of the pair of signaling devices. This exemplary embodiment or another exemplary embodiment may further include that the step of emitting the set of indicating lights through the false bulkhead further includes that the set of indicating lights is diffused through the false bulkhead to obstruct a view of the pair of signaling devices. This exemplary embodiment or another exemplary embodiment may further include steps of reflecting at least one indicating light of the set of indicating lights, by a rear bulkhead of the tank vehicle, towards the false bulkhead; and reflecting the at least one indicating light of the set of indicating lights, by a divider of the tank vehicle, towards the false bulkhead.

In yet another aspect, an exemplary embodiment of the present disclosure may provide a rear lighting assembly for a tank vehicle. The rear lighting assembly includes a signaling device that operably engages with one of a rear bulkhead of the tank vehicle and a false bulkhead of the tank vehicle. The rear lighting assembly also includes a processor that electrically connects with the signaling device for commanding the signaling device to emit a set of indication lights through the false bulkhead and behind the tank vehicle. The rear light assembly also includes a power source that electrically connects with the signaling device and the processor.

This exemplary embodiment or another exemplary embodiment may further include a first material of the rear bulkhead; and a second material of the false bulkhead different than the first material; wherein the first material reflects the set of indication lights emitted by the signaling device; and wherein the second material transmits the set of indication lights emitted by the signaling device. This exemplary embodiment or another exemplary embodiment may further include a first material of the rear bulkhead; and a second material of the false bulkhead different than the first material; wherein the first material reflects the set of indication lights emitted by the signaling device; and wherein the second material is a transparent material to transmit the set of indication lights emitted by the signaling device that is free from obstructing a view of the signaling device. This exemplary embodiment or another exemplary embodiment may further include a first material of the rear bulkhead; and a second material of the false bulkhead different than the first material; wherein the first material reflects a light emitted by the signaling device; and wherein the second material is a translucent material to diffuse the set of indication lights emitted by the signaling device to obstruct a view of the signaling device. This exemplary embodiment or another exemplary embodiment may further include a second signaling device operably engaged with one of the rear bulkhead of the tank vehicle and the false bulkhead; wherein the second signaling device is electrically connected to the processor and operates independently of the signaling device. This exemplary embodiment or another exemplary embodiment may further include a first indication light of the set of indication lights emitted by the signaling device inside of a first compartment defined by the tank vehicle; wherein the first indication light passes through a first portion of the false bulkhead to indicate a first turn signal of the tank vehicle. This exemplary embodiment or another exemplary embodiment may further include a second indication light of the set of indication lights emitted by the second signaling device inside of a second compartment defined by the tank vehicle; wherein the second indication light passes through a second portion the false bulkhead adjacent to the first portion of the false bulkhead to indicate a second turn signal of the tank vehicle. This exemplary embodiment or another exemplary embodiment may further include a third indication light of the set of indication lights emitted by the signaling device inside of the first compartment defined by the tank vehicle and emitted by the second signaling device inside of the second compartment defined by the tank vehicle; wherein the third indication light passes through the first portion of the false bulkhead and the second portion the false bulkhead to indicate braking of the tank vehicle. This exemplary embodiment or another exemplary embodiment may further include a set of first auxiliary signaling devices operably engaged with one of an extension wall of the tank vehicle and a first side wall of a divider of the tank vehicle; wherein the set of first auxiliary signaling devices operates in conjunction with the signaling device. This exemplary embodiment or another exemplary embodiment may further include that each of the extension wall and the first side wall of the divider is configured to reflect the set of indication lights emitted by the set of first auxiliary signaling devices. This exemplary embodiment or another exemplary embodiment may further include that the set of first auxiliary signaling devices further comprises: at least one auxiliary signaling device operably engaged with the extension wall. This exemplary embodiment or another exemplary embodiment may further include that the set of first auxiliary signaling devices further comprises: at least another auxiliary signaling device operably engaged with the extension wall and the first side wall of the divider. This exemplary embodiment or another exemplary embodiment may further include a set of second auxiliary signaling devices operably engaged with one of the extension wall of the tank vehicle and a second side wall of the divider of the tank vehicle and surrounding the signaling device; wherein the set of second auxiliary signaling devices operates in conjunction with the second signaling device. This exemplary embodiment or another exemplary embodiment may further include that each of the extension wall and the second side wall of the divider is configured to reflect the set of indication lights emitted by the set of second auxiliary signaling devices. This exemplary embodiment or another exemplary embodiment may further include that the set of second auxiliary signaling devices further comprises: at least one auxiliary signaling device operably engaged with the extension wall. This exemplary embodiment or another exemplary embodiment may further include that the set of first auxiliary signaling devices further comprises: at least another auxiliary signaling device operably engaged with the extension wall and the second side wall of the divider.

In yet another aspect, an exemplary embodiment of the present disclosure may provide a rear lighting assembly for indicating direction of travel for a tank vehicle. The rear lighting assembly includes a first signaling device that operably engages with one of a rear bulkhead of the tank vehicle and a false bulkhead of the tank vehicle. The rear light assembly also includes a second signaling device that operably engages with one of the rear bulkhead of the tank vehicle and the false bulkhead. The rear light assembly also includes a processor that electrically connects with the first signaling device and the second signaling device for commanding each of the first signaling device and the second signaling device to emit a set of indication lights through the false bulkhead and behind the tank vehicle. The rear light assembly also includes a power source that electrically connects with the first signaling device, the second signaling device, and the processor.

This exemplary embodiment or another exemplary embodiment may further include a first material of the rear bulkhead; and a second material of the false bulkhead different than the first material; wherein the first material reflects set of indication lights emitted by the first signaling device and the second signaling device; and wherein the second material is a translucent material to diffuse the set of indication lights emitted by the first signaling device and the second signaling device and to obstruct a view of the first signaling device and the second signaling device. This exemplary embodiment or another exemplary embodiment may further include a set of first auxiliary signaling devices operably engaged with one of an extension wall of the tank vehicle and a first side wall of a divider of the tank vehicle; wherein the set of first auxiliary signaling devices operates in conjunction with the first signaling device. This exemplary embodiment or another exemplary embodiment may further include a set of second auxiliary signaling devices operably engaged with one of the extension wall of the tank vehicle and a second side wall of the divider of the tank vehicle; wherein the set of second auxiliary signaling devices operates in conjunction with the second signaling device.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
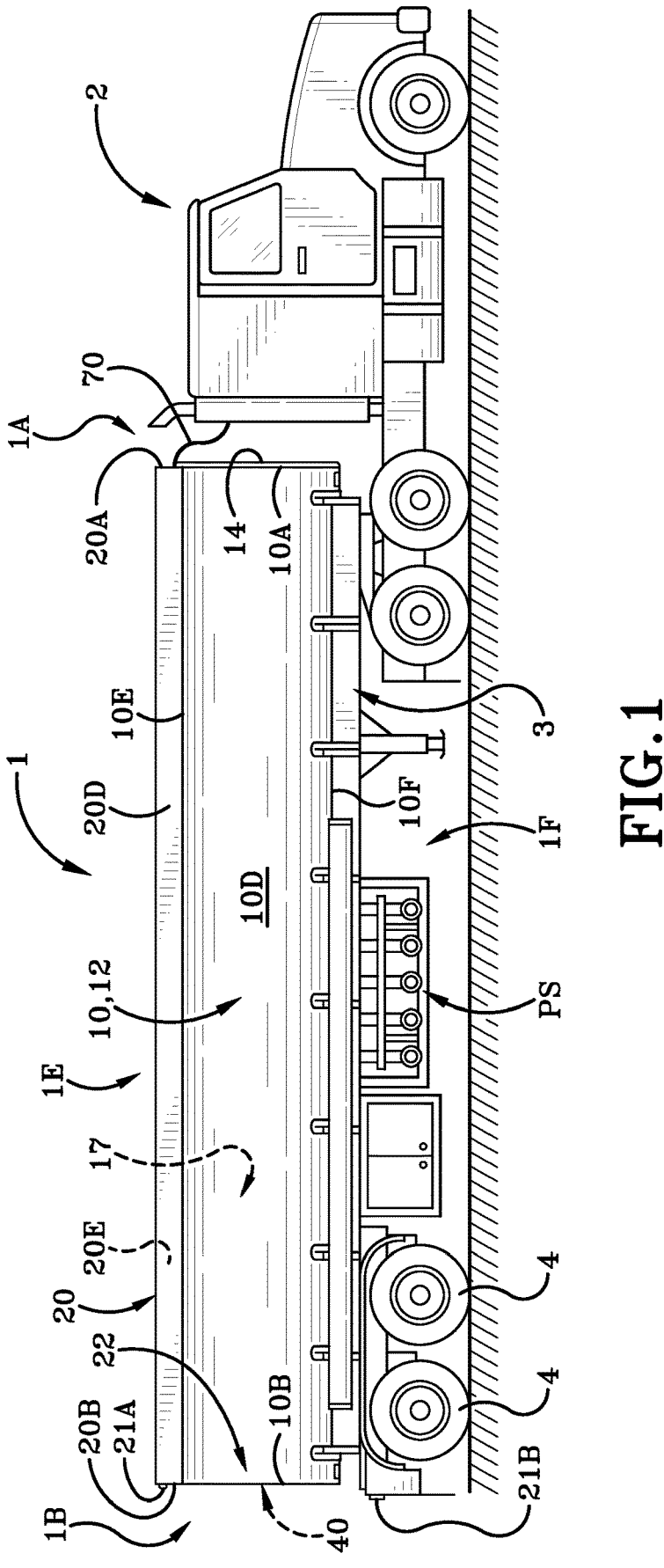
FIG. 1 is a side elevation view of a trailer operably engaged with a vehicle, wherein the trailer is equipped with a rear lighting assembly in accordance with an aspect of the present disclosure.

FIG. 1 illustrates a trailer or towed vehicle, which is generally indicated by the reference number 1. The trailer 1 illustrated in FIG. 1 is a tank trailer or tank vehicle. It will be understood that the illustrated trailer 1 is exemplary only and any type of trailer is contemplated to be represented by the illustrated trailer. Exemplary trailers considered suitable herein include enclosed trailers, dry van trailers, dump trailers, transfer trailers, pneumatic tank trailers, liquid tank trailers, horse trailers, livestock trailers, tilt trailers, utility trailers, and any other similar trailers of the like for the purpose of being towed.

As illustrated in FIG. 1, the trailer 1 has a front end 1A, a rear end 1B longitudinally opposite to the front end 1A, and a longitudinal direction defined therebetween where the trailer 1 may travel forwardly and backwardly along the longitudinal direction when operably engaged with a towing vehicle (described below). The trailer 1 also has a first side or left side 1C, a second side or right side 1D transversely opposite to the left side 1C, and a transverse direction defined therebetween where the trailer 1 may travel laterally (i.e., turning left and/or right) along the transverse direction when operably engaged with a towing vehicle (described below). The trailer 1 also has a top end 1E, a bottom end 1F vertically opposite to the top end 1E, and a vertical direction defined therebetween for draining accumulated precipitation, which is described in more detail below.

Still referring to FIG. 1, the trailer 1 may be mechanically connected to a vehicle or towing vehicle, which is generally indicated by the reference number 2. In FIG. 1, the vehicle 2 is a semi-truck mechanically connected to the trailer 1. It will be understood that the illustrated vehicle 2 is exemplary only and any type of vehicle is contemplated to be represented by the illustrated vehicle. Exemplary vehicles considered suitable herein include all-terrain vehicles, cars, sport utility vehicles (SUV), pickup trucks, vans, recreational vehicles, commercial trucks, and any other vehicles of the like used for the purpose of towing a trailer.

Still referring to FIG. 1, the trailer 1 may include a main body 10. The main body 10 may be operably engaged with a frame 3 of the trailer 1. The frame 3 includes at least one wheel and/or tire 4 operably engaged with the frame 3 for suitable moving and transporting the trailer 1 with the vehicle 2. The frame 3 may include any suitable components and/or assemblies for loading and unloading cargo or a load from the main body 10, parking or maintaining the trailer 1 when disconnected from the vehicle 2, providing energy or power to the trailer when disconnected from the vehicle 2, and other suitable components and/or assemblies of the like.

Figure 2:
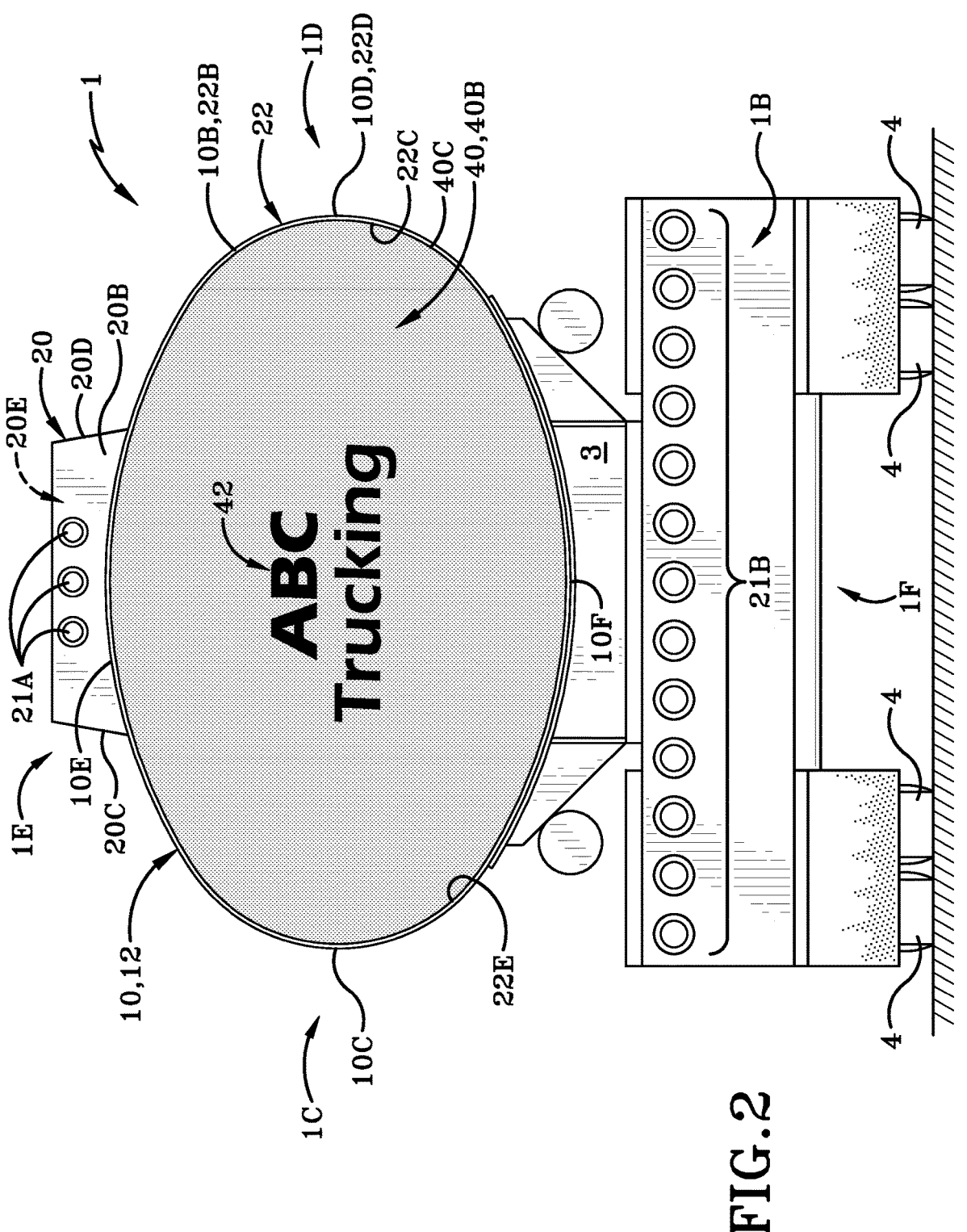
FIG. 2 is a rear elevation view of the trailer equipped with the rear lighting assembly shown in FIG. 1.

Referring to FIGS. 1 and 2, the main body 10 may have a front end 10A, a rear end 10B longitudinally opposite to the front end 10A, and a longitudinal axis defined therebetween. The main body 10 also has a first side or left side 10C, a second side or right side 10D transversely opposite to the left side 10C, and a transverse axis defined therebetween. The main body 10 also has a top end 10E, a bottom end 10F vertically opposite to the top end 10E, and a vertical axis defined therebetween. The main body 10 also includes a circumferential wall or external wall 12 that extends from the front end 10A to the rear end 10B along the longitudinal axis. The circumferential wall 12 also operably engages with frame 3 for maintaining the main body 10 with the frame 3.

Figure 3A:
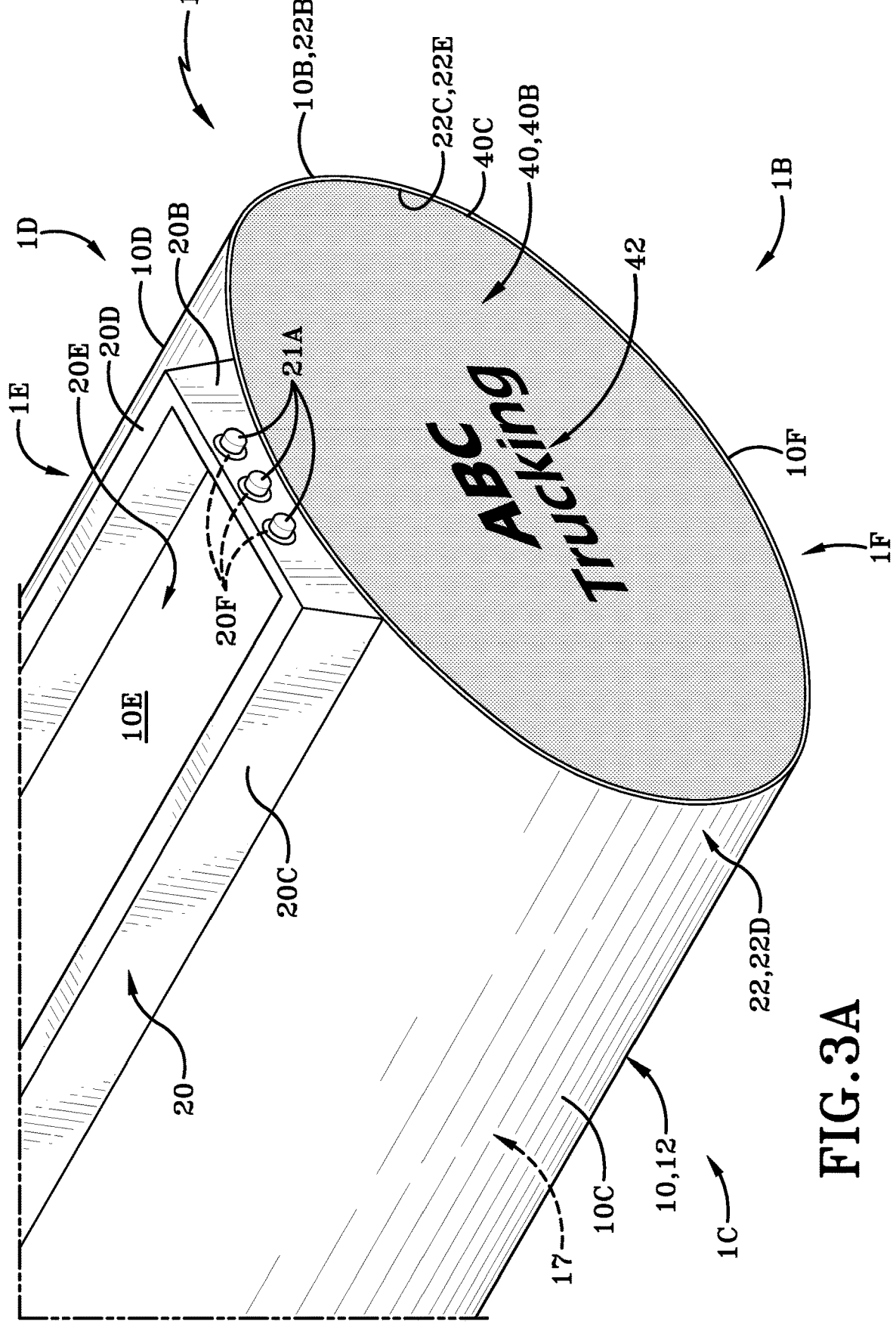
FIG. 3A is a partial top, rear, second side isometric perspective view of the trailer equipped with the rear lighting assembly shown in FIG. 1.
Figure 3B:
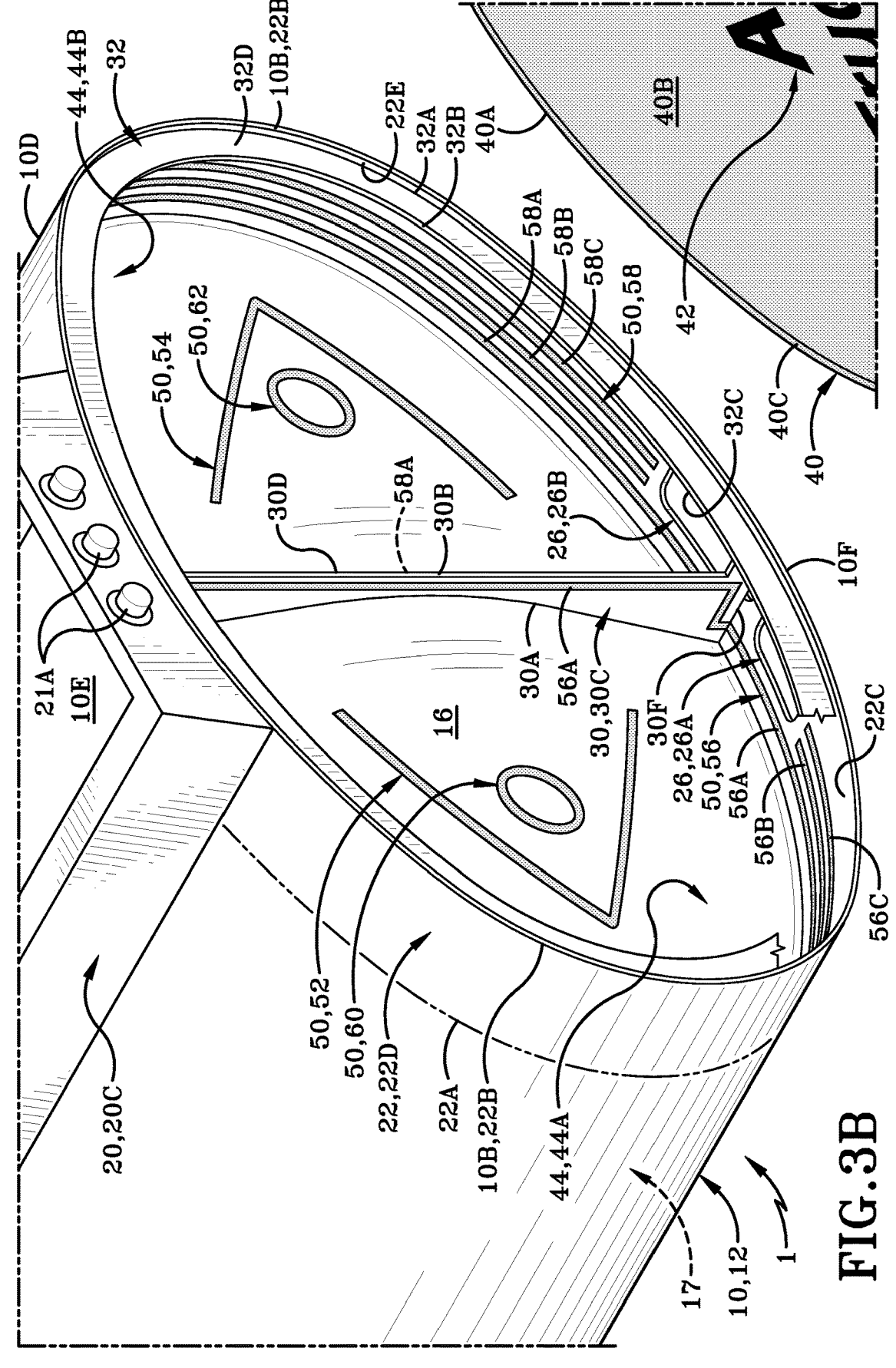
FIG. 3B is an exploded perspective view of the trailer equipped with the rear lighting assembly, wherein a false bulkhead of the rear lighting assembly is removed from the trailer and is made of translucent material.

Referring to FIG. 3B, the main body 10 may include a front bulkhead 14 operably engaged with the circumferential wall 12 at the front end 10A of the main body 10 proximate to the vehicle 2. The main body 10 may also include an opposing rear bulkhead 16 (see FIGS. 3A and 4B-7) operably engaged with the circumferential wall 12 at the rear end 10B of the main body 10. Additionally, the circumferential wall 12, the front bulkhead 14, and the rear bulkhead 16 may collectively define at least one interior chamber 17 that extends from the front bulkhead 14 to the rear bulkhead 16.

The at least one interior chamber 17 may be accessible at various location along the main body 10 for loading cargo into the at least one interior chamber 17 and/or and for unloading cargo from the at least one interior chamber 17. As illustrated in FIG. 1, a piping system "PS" of the trailer 1 may be in fluid communication with the at least one interior chamber 17 of the main body 10 for loading cargo into the at least one interior chamber 17 and for unloading cargo from the at least one interior chamber 17. In other exemplary embodiments, any suitable number of inlets and outlets may be defined in the main body 10 for loading cargo into the at least one interior chamber 17 and for unloading cargo from the at least one interior chamber 17.

While the main body 10 defines at least one interior chamber 17 accessible by the piping system "PS, any suitable number of interior chambers may be defined by the main body and accessible by any suitable number of pipes in a piping system. In one exemplary embodiment, a main body may include an interior bulkhead positioned between a front bulkhead and a rear bulkhead where the main body defines a first interior chamber between the front bulkhead and the interior bulkhead and an exterior chamber between the rear bulkhead and the interior bulkhead. In another exemplary embodiment, a main body may include a plurality of interior bulkheads positioned between a front bulkhead and a rear bulkhead where the main body defines a plurality of interior chambers between each interior bulkhead, the front bulkhead, and the rear bulkhead.

Trailer 1 may include a trough 20 that operably engages with the main body 10 along the top end 10E of the main body 10. In the present disclosure, the trough 20 may extend between the front and rear ends 10A, 10B of the main body 10. In the present disclosure, the trough 20 may also extend beyond the front bulkhead 14 and/or the rear bulkhead 16 of the main body 10, which is described in more detail below.

In the present disclosure, trough 20 may include a front wall 20A, an rear wall 20B longitudinally opposite to the front wall 20A (see FIG. 1), a first side wall or left wall 20C, and second side wall or right wall 20D transversely opposite to the left wall 20C. The trough 20 may define a channel 20E that is collectively defined by the front wall 20A, rear wall 20B, left wall 20C, and right wall 20D. The channel 20E also extends along the entire length of the trough 20 parallel to the longitudinal direction of the trailer 1. The channel 20E defined by the trough 20 may be configured to gather and capture liquid or fluid that enters into the channel 20E. In operation, the trough 20 may be configured to convey rainwater or other forms of precipitation in liquid form from the top end 10E of the main body 10 towards an on-board drainage system for removing the precipitation.

The trough 20 may define a plurality of through-holes 20F at the rear end 10B of the main body 10. As best seen in FIG. 3B, the plurality of through-holes 20F defined by the trough 20 may be configured to receive and house a set of first external brake lights 21A where the set of first external brake lights 21A is operably engaged with the trough 20. In the illustrated embodiment, the set of first external brake lights 21A operably engaged with the trough 20 is used as the third brake light for the trailer 1.

In the present disclosure, trailer 1 may also include a set of second external brake lights 21B. As best seen in FIG. 2, the set of second external brake lights 21B operably engages with frame 3 and is vertically below the main body 10 and the set of first external brake lights 21A. In the illustrated embodiment, the set of second external brake lights 21B, in combination with the set of first external brake lights 21A, is used as the third brake light for the trailer 1.

In the illustrated embodiment, the main body 10 may be made of a first material, which includes the circumferential wall 12, the front bulkhead 14, the rear bulkhead 16, and the trough 20. In the present disclosure, the first material may be a material that is adapted to reflect light emitted from a rear lighting assembly of trailer 1. In one example, the main body 10 may be made from a metal material, specifically aluminum. In another example, the circumferential wall 12, the front bulkhead 14, the rear bulkhead 16, and the trough 20 may each be made from aluminum material. In yet another example, any suitable metal material may be used to make a main body (and its associated components) for a trailer based on various reasons described and illustrated herein.

Figure 4:
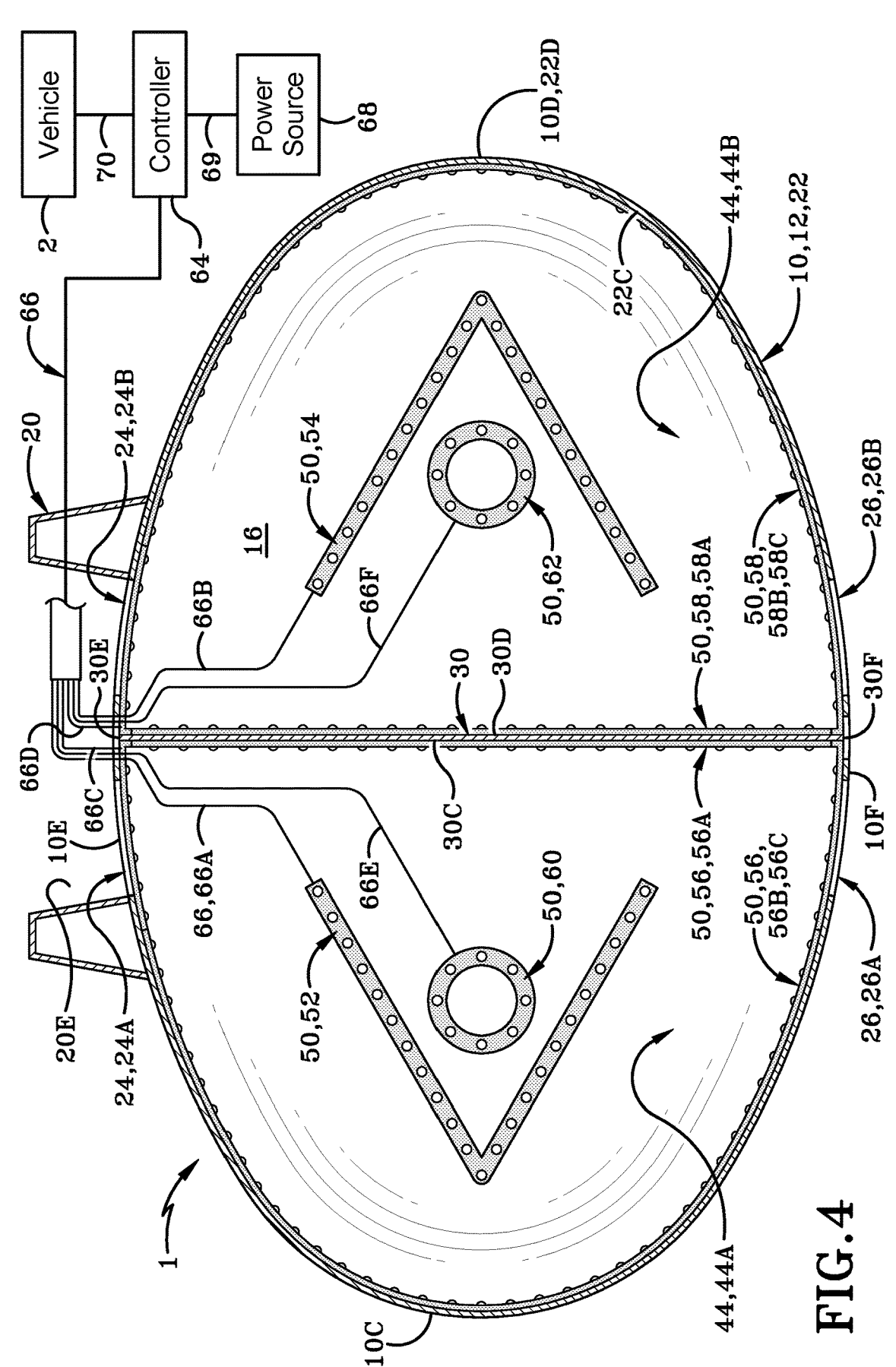
FIG. 4 is a rear elevation view of the trailer equipped with the rear lighting assembly, wherein the false bulkhead of the rear lighting assembly is removed from the trailer.

Trailer 1 may include at least one drainage portion or extension wall 22 that operably engages with the main body 10. More particularly, the extension wall 22 may be a portion of the circumferential wall 12 of the main body 10. As illustrated in FIGS. 3B-4, extension wall 22 of the circumferential wall 12 extends rearwardly away from the rear bulkhead 16 parallel to the longitudinal axis of the trailer 1. In the illustrated embodiment, the circumferential wall 12 and the extension wall 22 is a unibody, monolithic member that is continuous and uninterrupted. In one exemplary embodiment, an extension wall discussed herein may operably engage with a circumferential wall of a main body via attachment mechanisms (e.g., joining mechanisms, fusing mechanisms, welding mechanisms, etc.).

As illustrated in FIG. 3B, the extension wall 22 may include a front end 22A that is proximate to the rear bulkhead 16. Extension wall 22 may also include a rear end 22B that is longitudinally opposite to the front end 22A and is remote and spaced apart from the rear bulkhead 16. The extension wall 22 may also have an inner surface 22C that is defined circumferentially about the extension wall 22. In the present disclosure, the inner surface 22C extends between the front end 22A, proximate to the rear bulkhead 16, and the rear end 22B. The extension wall 22 may also have an outer surface 22D that opposes the inner surface 22C and is defined circumferentially about the extension wall 22. The outer surface 22D may also extend from the front end 22A, proximate to the rear bulkhead 16, to the rear end 22B of the extension wall 22.

Trailer 1 may also include a rear opening 22E that is defined by the rear the exterior wall 22. As best seen in FIG. 3B, the rear opening 22E extends forwardly into the trailer 1 from the rear end 22B of the extension wall 22 to the front end 22A. In the present disclosure, the rear opening 22E is separated from the interior chamber 17 by the rear bulkhead 16 such that the interior chamber 17 and the rear opening 22E are free from fluid communication. As discussed in greater detail below, one or more signaling devices of a rear lighting assembly of trailer 1 may be housed inside of rear opening 22F and be protected from external elements outside the rear opening.

Trailer 1 may include at least one upper drain opening 24 that is defined in extension wall 22 and that extends entirely through the extension wall 22. As illustrated in FIGS. 3B-4, extension wall 22 may define a first upper drain opening 24A and an adjacent second upper drain opening 24B that extend entirely through the extension wall 22 in which the inner surface 22C and the outer surface 22D are in fluid communication with one another through each of the first and second upper drain openings 24A, 24B. As illustrated in FIGS. 3B-4, the first and second upper drain openings 24A, 24B are defined proximate to the top end 10E of the main body 10. The first and second upper drain openings 24A, 24B may also be in fluid communication with the trough 20 due to the first and second upper drain openings 24A, 24B being defined inside of the channel 20E of said trough 20.

The structural configuration of the first and second upper drain openings 24A, 24B and the trough 20 is considered advantageous at least because the first and second upper drain openings 24A, 24B may provide drainage of the accumulated precipitation from the trough 20, through the extension wall 22, and away from the main body 10 and the trailer 1. In one exemplary embodiment, a portion of a trough may be sloped from a medial point of the trough towards a rear drainage portion to suitable drain liquid precipitation away from the main body that is both concealed and isolated from an interior chamber of a main body. Moreover, the first and second upper drain openings 24A, 24B omit additional drainage members (e.g., conduits or pipe members) for draining liquid precipitation to prevent freezing or clogging with frozen precipitation or unwanted debris commonly attributed to drainage members.

Trailer 1 may also include at least one lower drain opening 26 defined in extension wall 22 that extends entirely through the extension wall 22. As illustrated in FIGS. 3B-4, extension wall 22 may include a first lower drain opening 26A and an adjacent second lower drain opening 26B that extend entirely through the extension wall 22 in which the inner surface 22C and the outer surface 22D are in fluid communication with one another at each of the first and second lower drain openings 26A, 26B. As illustrated in FIGS. 3B-4, the first and second lower drain openings 26A, 26B are defined proximate to the bottom end 10F of the main body 10. The first and second lower drain openings 26A, 26B may also be in fluid communication with the trough 20 and the first and second upper drain openings 24A, 24B.

The structural configuration of the first and second lower drain openings 26A, 26B defined by the extension wall 22 is considered advantageous at least because the first and second lower drain openings 26A, 26B may provide drainage of the accumulated precipitation from the trough 20 and away from the main body 10 and the trailer 1. As illustrated in FIG. 4, the first and second lower drain openings 26A, 26B may be aligned with the first and second upper drain openings 24A, 24B to allow for consistent flow of accumulated precipitation along a vertical axis through each associated upper and lower drain opening. Additionally, the curvature of the extension wall 22 allows the inner surface 22C to act as a funnel to convey any excess fluid to drain towards one or both of the first and second lower drain openings 26A, 26B. Moreover, the first and second lower drain openings 26A, 26B omit additional drainage members (e.g., conduits or pipe members) for draining liquid precipitation to prevent freezing or clogging with frozen precipitation or unwanted debris commonly attributed to drainage members.

While trailer 1 includes trough 20, first and second upper drain openings 24A, 24B, and first and second lower drain openings 26A, 26B, a trailer discussed herein may remove and/or omit one or all of the trough 20, first and second upper drain openings 24A, 24B, and first and second lower drain openings 26A, 26B for various reasons, including the elimination of drainage through extension wall 22.

Trailer 1 may also include at least one divider 30 that operably engages with at least one of the rear bulkhead 16 and extension wall 22. As best seen in FIGS. 3B-4, divider 30 includes a first or front end 30A that operably engages with the rear bulkhead 16 external to the interior chamber 17, and a second or rear end 30B that is opposite to the front end 30A and is spaced apart from the false bulkhead 40. Divider 30 also includes a first side wall 30C that extends transversely between the front end 30A and the rear end 30B, and a second side wall 30D that extends transversely between the front end 30A and the rear end 30B and is opposite to the first side wall 30C. Divider 30 also includes a top end 30E that is positioned vertically above the front end 30A, the rear end 30B, the first side wall 30C, and the second side wall 30D and that operably engages with the extension wall 22, particularly the inner surface 22C of extension wall 22. Divider 30 also includes a bottom end 30F that is positioned vertically below the front end 30A, the rear end 30B, the first side wall 30C, and the second side wall 30D and that operably engages with the extension wall 22, particularly the inner surface 22C of extension wall 22. Such use and purpose of divider 30 is discussed in greater detail below.

In operation, divider 30 provides various uses for trailer 1. In one instance, vertical walls of the divider 30 (i.e., first side wall 30C and second side wall 30D) may act as funnels and/or guides to convey any excess fluid from one or both of the first and second upper drain openings 24A, 24B to one or both of the first and second lower drain openings 26A, 26B. In another instance, the vertical walls of the divider 30 (i.e., first side wall 30C and second side wall 30D) may act as mounting surfaces or points for one or more sets of auxiliary signaling devices of a rear lighting assembly of the trailer 1.

Trailer 1 also includes a mounting wall 32 that operably engages with the extension wall 22. As best seen in FIGS. 3B-4, mounting wall 32 extends radially inwards from the inner surface 22C of the extension wall 22. In the present disclosure, mounting wall 32 includes an outer edge 32A that extends circumferentially about the mounting wall 32 and operably engages with the inner surface 22C of the extension wall 22. Mounting wall 32 also includes an inner edge 32B that extends circumferentially about the mounting wall 32 and is opposite to the outer edge 32A. In the present disclosure, the inner edge 32B is also free from engaging with the extension wall 22. Mounting wall 32 also includes a first or interior surface 32C that extends between the outer edge 32A and the inner edge 32B and faces in a direction towards the rear bulkhead 16. Mounting wall 32 also includes a second or exterior surface 32D that extends between the outer edge 32A and the inner edge 32B and faces in a direction towards the rear end 22B of extension wall 22. In the present disclosure, exterior surface 32D is configured to operably engage with a false bulkhead of trailer 1 that is spaced apart from and positioned rearwardly of the rear bulkhead 16, which is discussed in greater detail below.

Trailer 1 may also include at least one removable false bulkhead 40 that operably engages with at least one of the extension wall 22, the divider 30, and the mounting wall 32. The at least one removable false bulkhead 40 is independent from one or both of the front bulkhead 14 and the rear bulkhead 16 of the main body 10. As best seen in FIGS. 3A-3B, trailer 1 includes a single false bulkhead 40 that operably engages with the extension wall 22 and the mounting wall 32. In the present disclosure, false bulkhead 40 is remote and spaced apart from the rear bulkhead 16 in trailer 1. Stated differently, the false bulkhead 40 is free from engagement with the rear bulkhead 16.

As best seen in FIG. 3B, false bulkhead 40 may include an inner surface 40A facing in a direction towards the rear bulkhead 16 of the main body 10. In the present disclosure, the inner surface 40A is continuous and uninterrupted along the entire surface area of inner surface 40A. False bulkhead 40 may also include an outer surface 40B that faces in a direction away from the rear bulkhead 16 of the main body 10 and opposite to the inner surface 40A. In the present disclosure, the outer surface 40B is also continuous and uninterrupted along the entire surface area of outer surface 40B. In the present disclosure, the inner surface 40A also operably engages with the mounting wall 32, particularly with the exterior surface 32D of mounting wall 32, when trailer 1 is assembled. False bulkhead 40 may also include a surrounding edge 40C that extends circumferential about the false bulkhead 40 and is positioned between the inner surface 40A and the outer surface 40B. In the present disclosure, the surrounding edge 40C also operably engages with the extension wall 22, particularly with the inner surface 22C of extension wall 22, when trailer 1 is assembled.

Upon assembly of trailer 1, false bulkhead 40 is flush or even with the extension wall 22 such that the false bulkhead 40 is observed as the rearmost end of trailer 1 when viewed from a side elevation view (see FIG. 1) or a rear view (see FIGS. 2-3A). More particularly, the outer surface 40B of the false bulkhead 40 is flush or even with the rear end 22B of the extension wall 22 when viewed from a side elevation view or a rear view.

False bulkhead 40 may be adapted to display or provide graphics 42 on the outer surface 40B of the false bulkhead 40 that faces rearwardly away from the trailer 1. As illustrated in FIGS. 2-3A and 5A-7D, the graphics 42 may display any suitable print, engraving, etching, photograph, design, or any other suitable visual art or typographical marking of the like. Such use of the graphics 42 on false bulkhead 40 is considered advantageous at least because the graphics 42 may provide advertising and marketing methods for a company using said false bulkhead assembly 40 on the trailer 1. As such, the graphics 42 may be custom to a specific entity or product that displays a company's or product name, a company's trademark, or any other suitable use for advertising and marketing a specific company or a specific product being hauled in a tank trailer or tank vehicle like trailer 1.

It should be understood that false bulkhead 40 is also made of a second material that is different than the first material of the main body 10 (including circumferential wall 12, front bulkhead 14, and rear bulkhead 16). In the present disclosure, false bulkhead 40 is made of a material that allows light, particularly visible light wavelengths, to pass through the false bulkhead 40 when emitted by a rear lighting assembly of trailer 1, which is discussed in greater detail below.

In one example, false bulkhead 40 may be made of a translucent material, partially or entirely, to diffuse light emitted by a rear lighting assembly of trailer 1 through false bulkhead 40 that obstructs a view of one or more signaling devices of the rear lighting assembly of trailer 1 (see FIGS. 2-3B and FIGS. 5A-5E). In this example, the translucent material may be a polymer or plastic material to diffuse light emitted by a rear lighting assembly of trailer 1 through false bulkhead 40 that obstructs a view of one or more signaling devices of the rear lighting assembly of trailer 1. Upon such light emission, graphics 42 may also be illuminated by the light from the rear lighting assembly of trailer 1 when the light emitted by the rear lighting assembly is brighter than natural light surrounding trailer 1.

Figure 6:
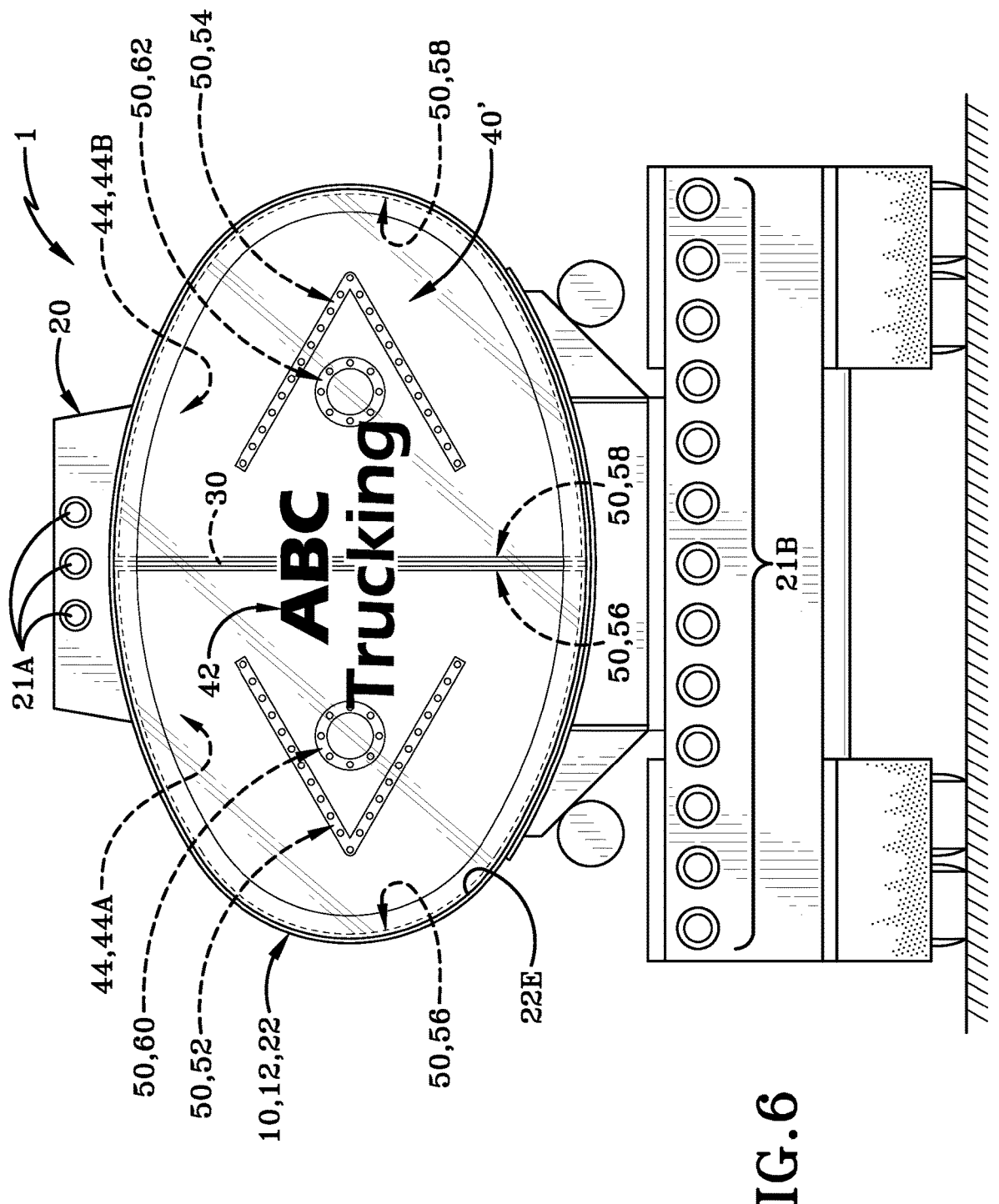
FIG. 6 is a rear elevation view of the trailer, wherein the false bulkhead of the rear lighting assembly is made of transparent material.
Figure 7A:
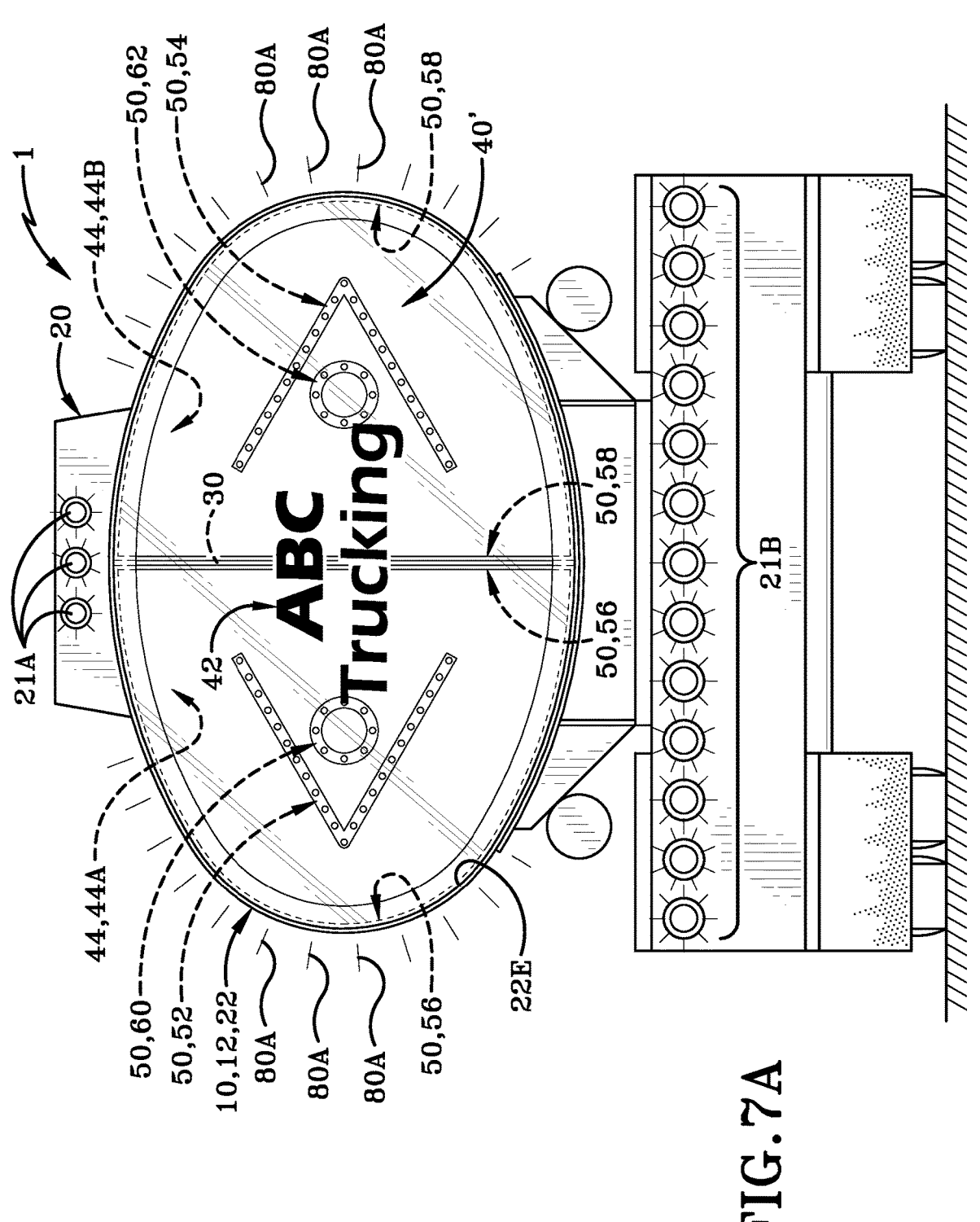
FIG. 7A is an operational view of the trailer equipped with the false bulkhead shown in FIG. 6, wherein at least two signaling device of the rear lighting assembly emit a running light signal through the false bulkhead.
Figure 7B:
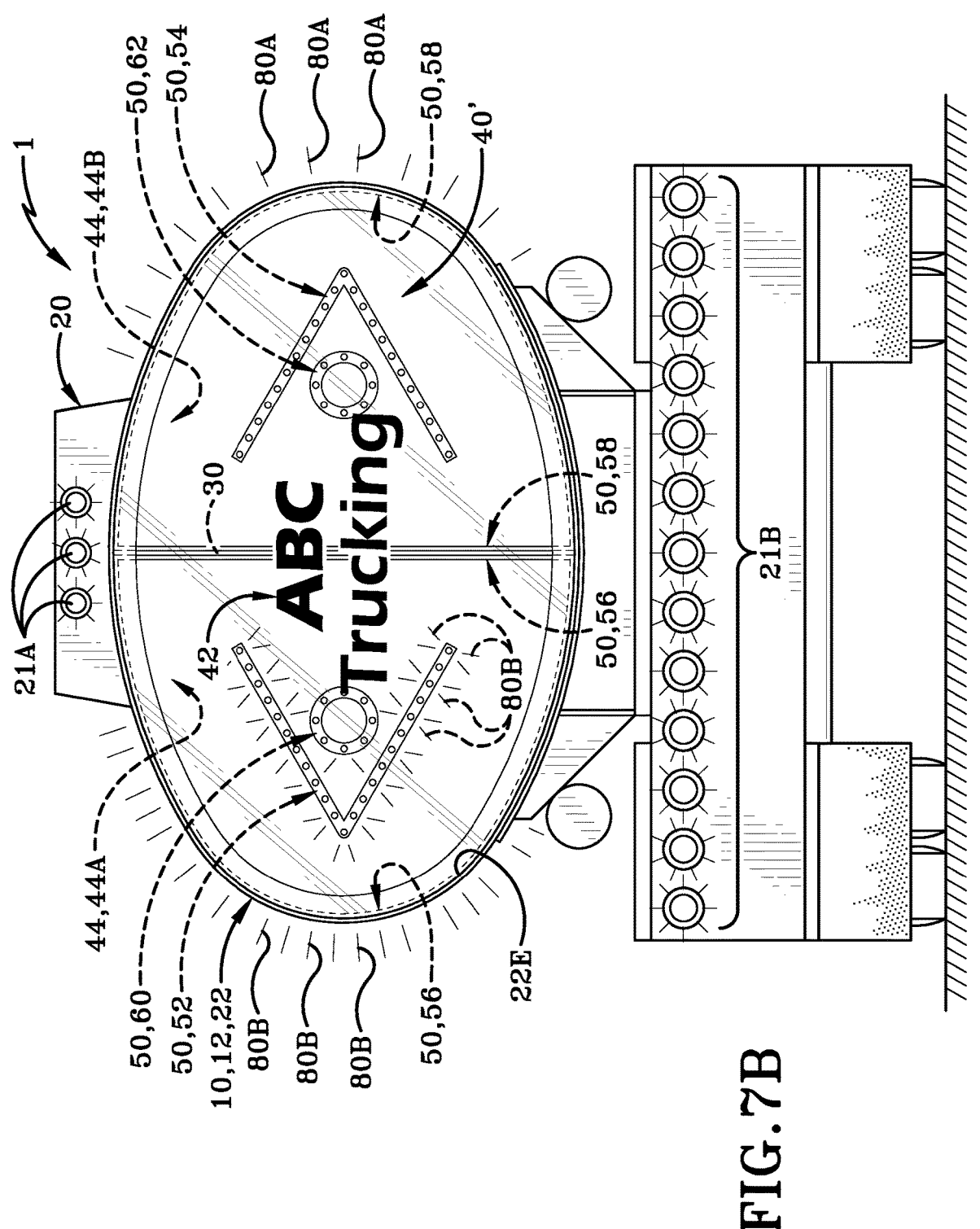
FIG. 7B is another operational view of the trailer equipped with the false bulkhead shown in FIG. 6, but a first signaling device of the rear lighting assembly emits a first turning indicator light to indicate a first direction of travel for the trailer.
Figure 7C:
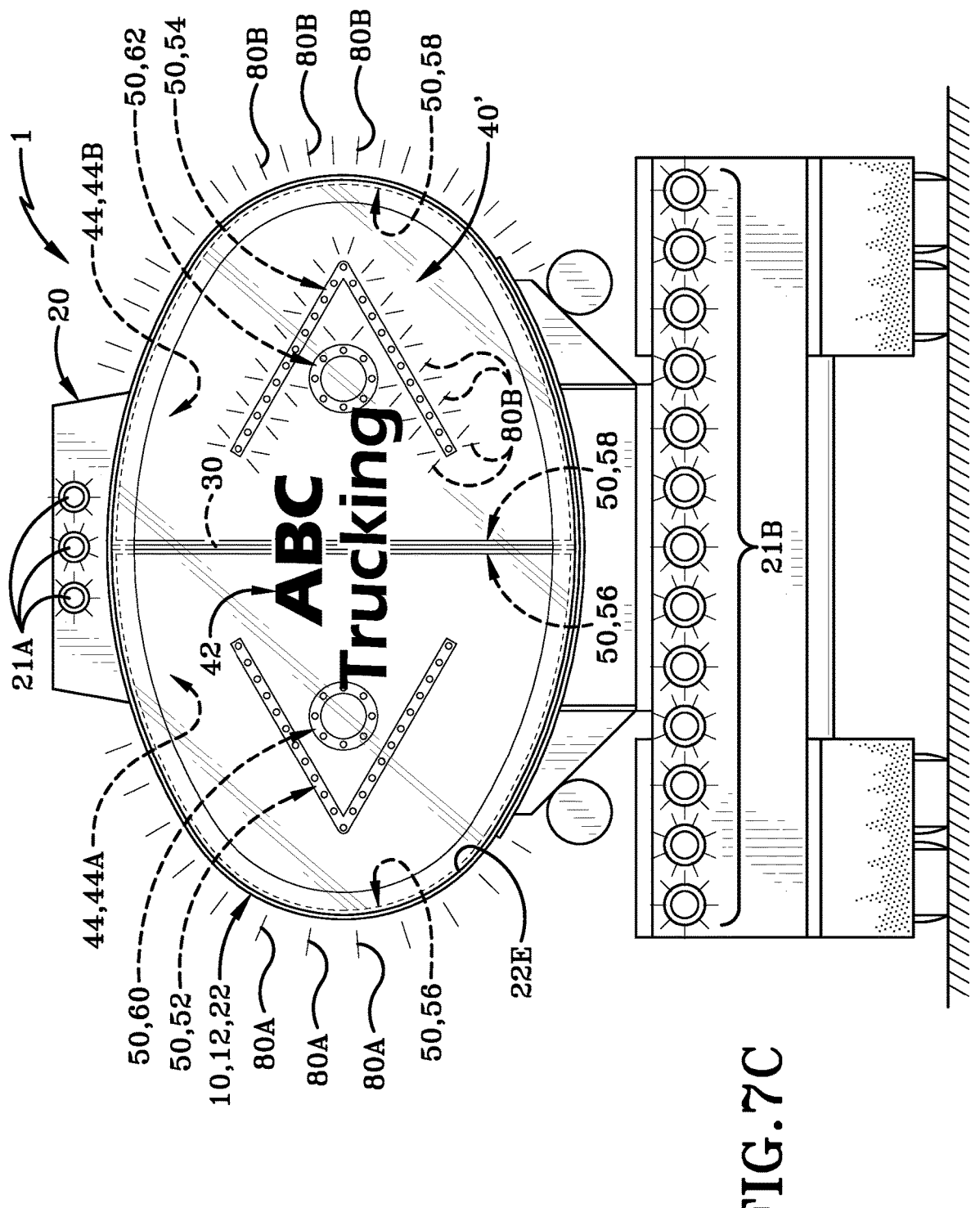
FIG. 7C is another operational view of the trailer equipped with the false bulkhead shown in FIG. 6, but a second signaling device of the rear lighting assembly emits a second turning indicator light to indicate a second direction of travel for the trailer.
Figure 7D:
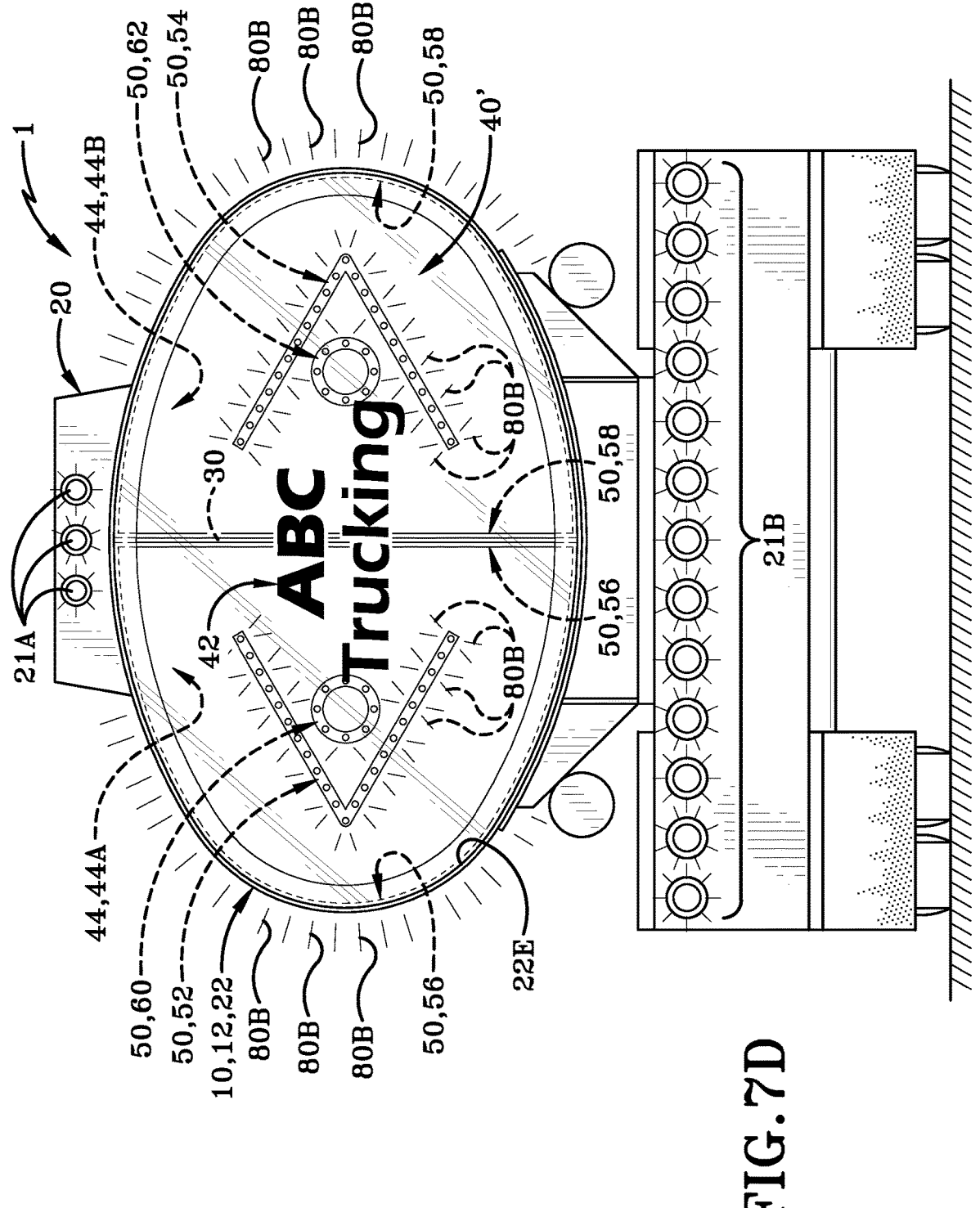
FIG. 7D is another operational view of the trailer equipped with the false bulkhead shown in FIG. 6, but both the first and second signaling devices of the rear lighting assembly emits a braking indicator light to indicate a braking or deceleration of the trailer.
Figure 7E:
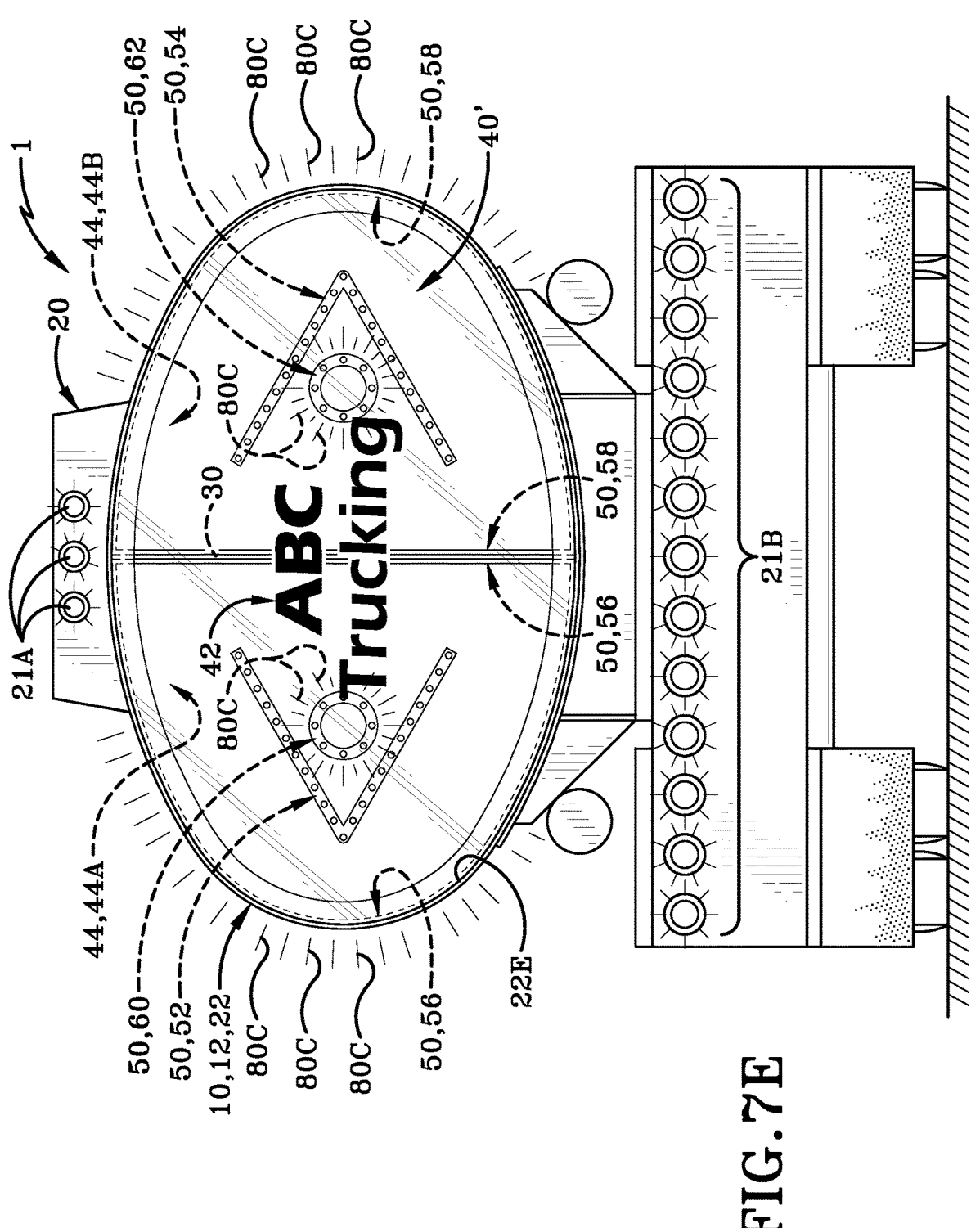
FIG. 7E is another operational view of the trailer equipped with the false bulkhead shown in FIG. 6, but at least two reverse signaling device of the rear lighting assembly emit reverse light signals through the false bulkhead.

In another example, an alternative false bulkhead 40' may be made of a transparent material, partially or entirely, to transmit light emitted by a rear lighting assembly of trailer 1 through false bulkhead without obstructing a view of one or more signaling devices of the rear lighting assembly of trailer 1 (see FIGS. 6-7E). In this example, the translucent material may be a polymer or plastic material to transmit light emitted by a rear lighting assembly of trailer 1 through false bulkhead 40 without obstructing a view of one or more signaling devices of the rear lighting assembly of trailer 1. Upon such light emission, graphics 42 may also be illuminated by the light from the rear lighting assembly of trailer 1 when the light emitted by the rear lighting assembly is brighter than natural light surrounding trailer 1.

It should also be understood that extension wall 22 may also be made from the first material discussed herein or the second material discussed herein. In the present disclosure, extension wall 22 is made of the first material (as discussed above) that reflect light outwardly towards the false bulkhead 40 when emitted by a rear lighting assembly of trailer 1, which is discussed in greater detail below. In one example, however, extension wall 22 may be made of a translucent material, partially or entirely, to diffuse light emitted by a rear lighting assembly of trailer 1 through false bulkhead 40 that obstructs a view of one or more signaling devices of the rear lighting assembly of trailer 1. In another example, extension wall 22 may be made of a transparent material, partially or entirely, to transmit light emitted by a rear lighting assembly of trailer 1 through false bulkhead 40 without obstructing a view of one or more signaling devices of the rear lighting assembly of trailer 1.

Trailer 1 may also include an exterior chamber 44 collectively defined by the rear bulkhead 16, the extension wall 22, and the false bulkhead 40 when assembled with extension wall 22. In the present disclosure, the exterior chamber 44 is defined from the rear bulkhead 16, along the inner surface 22C of extension wall 22, to the inner surface 40A of the false bulkhead 40. The exterior chamber 44 is also separated from the interior chamber 17 of main body 10 by the rear bulkhead 16; as such, the interior chamber 17 of main body 10 and the exterior chamber 44 are free from being in fluid communication with one another.

Still referring to exterior chamber 44, divider 30 is configured to separate the exterior chamber 44 into a first compartment 44A and a second compartment 44B. As best seen in FIGS. 3B-4, first compartment 44A is collectively defined by the rear bulkhead 16, a first portion of the inner surface 22C of the extension wall 22, the first side wall 30C of the divider 30, and a first portion of the inner surface 40A of false bulkhead 40. Still referring to FIGS. 3B-4, second compartment 44B is collectively defined by the rear bulkhead 16, a second portion of the inner surface 22C of the extension wall 22, the second side wall 30D of the divider 30, and a second portion of the inner surface 40A of false bulkhead 40. As discussed in greater detail below, the divider 30 is configured to separate signaling devices and sets of auxiliary signaling devices of a rear lighting assembly of trailer 1 for signaling driving states and/or directions of travel of trailer 1.

Trailer 1 also includes a rear lighting assembly 50. As discussed in greater detail below, rear lighting assembly 50 is configured to indicate to surrounding drivers and pedestrians the driving states or directions of travel of the trailer 1 along the entire rear end 1B of trailer 1. With such indication, surrounding drivers and pedestrians may clearly see and anticipate the driving states or directions of travel of the trailer 1 when traveling along a roadway. Such components and devices of rear lighting assembly 50 are discussed in greater detail below.

Rear lighting assembly 50 includes at least one turn signaling device 52 that operably engages with one of the rear bulkhead 16 and the false bulkhead 40 and is housed inside of the exterior chamber 44. As best seen in FIGS. 3B-4, rear lighting assembly 50 includes a first turn signaling device 52 that operably engages with the rear bulkhead 16 and is housed inside of the exterior chamber 44. Still referring to FIGS. 3B-4, rear lighting assembly 50 also includes a second turn signaling device 54 that operably engages with the rear bulkhead 16 and is housed inside of the exterior chamber 44. When trailer 1 is towed by vehicle 2, each of the first turn signaling device 52 and the second turn signaling device 54 is configured to emit at least one light signal at the false bulkhead 40 in response to one or more actions made by driver of the vehicle 2; such emission of at least one light signal by one or both of the first turn signaling device 52 and the second turn signaling device 54 is discussed in greater detail below.

In the present disclosure, the first turn signaling device 52 and the second turn signaling device 54 are also separated and spaced apart from the one another by the divider 30. As best seen in FIG. 4, the first turn signaling device 52 is
housed inside of the first compartment 44A and the second
turn signaling device 54 is housed inside of the second
compartment 44B. When trailer 1 is towed by vehicle 2,
each of the first turn signaling device 52 and the second turn
signaling device 54 is configured to emit at least one light
signal inside the first compartment 44A and the second
compartment 44B in response to one or more actions made
by driver of the vehicle 2 to signal that the trailer 1 and
vehicle are turning or traveling in a lateral direction relative
to the longitudinal direction of trailer 1 (see FIGS. 5A-5D
and 7A-7D); such emission of at least one light signal by one
or both of the first turn signaling device 52 and the second
turn signaling device 54 is discussed in greater detail below.

It should be understood that while the first turn signaling
device 52 and the second turn signaling device 54 are
encased inside of the exterior chamber 44 from the external
elements that surrounds trailer 1, first turn signaling device
52 and the second turn signaling device 54 may be config-
ured to operate with such external elements. In one instance,
first turn signaling device 52 and the second turn signaling
device 54 may be configured to operate with such external
elements (i.e., dirt, precipitation, and road debris) when the
trough 20, the first and second upper drain openings 24A,
24B, and the first and second lower drain openings 26A, 26B
are included with trailer 1. As such, the first turn signaling
device 52 and the second turn signaling device 54 are sealed
and protected from being hindered by dirt, precipitation
and/or other debris that enters into the exterior chamber at
the first and second upper drain openings 24A, 24B or the
first and second lower drain openings 26A, 26B.

Rear lighting assembly 50 also includes a set of first
auxiliary or peripheral signaling devices 56. In the present
disclosure, the set of first auxiliary signaling devices 56
operably engages with at least one of the extension wall 22
and the divider 30 and is housed inside of the exterior
chamber 44, particularly the first compartment 44A. As best
seen in FIGS. 3B-4, the set of first auxiliary signaling
devices 56 includes a first auxiliary signaling device 56A
that operably engages with the inner surface 22C of the
extension wall 22 and the first side wall 30C of the divider
30 inside of the first compartment 44A. The set of first
auxiliary signaling devices 56 may also include a second
auxiliary signaling device 56B and a third auxiliary signal-
ing device 56C that only operably engage with the inner
surface 22C of the extension wall 22 inside of the first
compartment 44A. During operation, the set of first auxiliary
signaling devices 56 may emit one or more light signals in
conjunction with the one or more light signals emitted by the
first turn signaling device 52.

While the set of first auxiliary signaling devices 56
includes three auxiliary signaling devices 56A, 56B, 56C,
any suitable number of auxiliary signaling devices may be
included in a rear lighting assembly as dictated by the
implementation, including the depth of an extension wall
discussed herein, the size, shape, and configuration of a false
bulkhead discussed herein, and other various considerations.
Examples of suitable numbers of auxiliary signaling devices
to be included in a rear lighting assembly include zero, one,
at least one, two, three, four, five, and other suitable numbers
of auxiliary signaling devices that may be included in a rear
lighting assembly as dictated by the implementation.

It should be understood that while the set of first auxiliary
signaling devices 56 is encased inside of the exterior cham-
ber 44 from the external elements that surrounds trailer 1, set
of first auxiliary signaling devices 56 may be configured to
operate with such external elements. In one instance, set of first auxiliary signaling devices 56 may be configured to
operate with such external elements (i.e., dirt, precipitation,
and road debris) when the trough 20, the first and second
upper drain openings 24A, 24B, and the first and second
lower drain openings 26A, 26B are included with trailer 1.
As such, each auxiliary signaling device of the set of first
auxiliary signaling devices 56 is sealed and protected from
being hindered by dirt, precipitation and/or other debris that
enters into the exterior chamber at the first and second upper
drain openings 24A, 24B or the first and second lower drain
openings 26A, 26B.

Rear lighting assembly 50 also includes a set of second
auxiliary or peripheral signaling devices 58. In the present
disclosure, the set of second auxiliary signaling devices 58
operably engages with at least one extension member 22 and
the divider 30 and is housed inside of the exterior chamber
44, particularly the second compartment 44B. As best seen
in FIGS. 3B-4, the set of second auxiliary signaling devices
58 includes a first auxiliary signaling device 58A that
operably engages with the inner surface 22C of the exten-
sion wall 22 and the second side wall 30D of the divider 30
inside of the second compartment 44B. The set of second
auxiliary signaling devices 58 may also include a second
auxiliary signaling device 58B and a third auxiliary signal-
ing device 58C that only operably engage with the inner
surface 22C of the extension wall 22 inside of the second
compartment 44B. During operation, the set of second
auxiliary signaling devices 58 may emit one or more light
signals in conjunction with the one or more light signals
emitted by the second signaling device 54.

While the set of second auxiliary signaling devices 58
includes three auxiliary signaling devices 58A, 58B, 58C,
any suitable number of auxiliary signaling devices may be
included in a rear lighting assembly as dictated by the
implementation, including the depth of an extension wall
discussed herein, the size, shape, and configuration of a false
bulkhead discussed herein, and other various considerations.
Examples of suitable numbers of auxiliary signaling devices
to be included in a rear lighting assembly include zero, one,
at least one, two, three, four, five, and other suitable numbers
of auxiliary signaling devices that may be included in a rear
lighting assembly as dictated by the implementation.

It should be understood that while the set of second
auxiliary signaling devices 58 is encased inside of the
exterior chamber 44 from the external elements that sur-
rounds trailer 1, set of second auxiliary signaling devices 58
may be configured to operate with such external elements. In
one instance, set of second auxiliary signaling devices 58
may be configured to operate with such external elements
(i.e., dirt, precipitation, and road debris) when the trough 20,
the first and second upper drain openings 24A, 24B, and the
first and second lower drain openings 26A, 26B are included
with trailer 1. As such, each auxiliary signaling device of the
set of second auxiliary signaling devices 58 is sealed and
protected from being hindered by dirt, precipitation and/or
other debris that enters into the exterior chamber at the first
and second upper drain openings 24A, 24B or the first and
second lower drain openings 26A, 26B.

Rear lighting assembly 50 may also include at least one
reverse signaling device 60 that operably engages with one
of the rear bulkhead 16 and the false bulkhead 40 and is
housed inside of the exterior chamber 44. As best seen in
FIGS. 3B-4, rear lighting assembly 50 includes a first
reverse signaling device 60 that operably engages with the
rear bulkhead 16 and housed inside of the exterior chamber
44. Still referring to FIGS. 3B-4, rear lighting assembly 50
also includes a second reverse signaling device 62 that operably engages with the rear bulkhead 16 and is housed inside of the exterior chamber 44. When trailer 1 is towed by vehicle 2, each of the first reverse signaling device 60 and the second reverse signaling device 62 is configured to emit at least one light signal at the false bulkhead 40 in response to one or more actions made by driver of the vehicle 2 to signal that the trailer 1 and vehicle 2 are traveling in reverse relative to the longitudinal direction of trailer 1; such emission of at least one light signal by one or both of the first reverse signaling device 60 and the second reverse signaling device 62 is discussed in greater detail below.

In the present disclosure, the first reverse signaling device 60 and the second turn signaling device 62 are also separated and spaced apart from the one another by the divider 30. As best seen in FIG. 4, the first reverse signaling device 60 is housed inside of the first compartment 44A and the second reverse signaling device 62 is housed inside of the second compartment 44B. When trailer 1 is towed by vehicle 2, each of the first reverse signaling device 60 and the second reverse signaling device 62 is configured to emit at least one light signal inside the first compartment 44A and the second compartment 44B in response to one or more actions made by driver of the vehicle 2 (see FIGS. 5E and 7E); such emission of at least one light signal by one or both of the first reverse signaling device 60 and the second reverse signaling device 62 is discussed in greater detail below.

It should be understood that while the first reverse signaling device 60 and the second turn signaling device 62 are encased inside of the exterior chamber 44 from the external elements that surrounds trailer 1, the first reverse signaling device 60 and the second turn signaling device 62 may be configured to operate with such external elements. In one instance, the first reverse signaling device 60 and the second turn signaling device 62 may be configured to operate with such external elements (i.e., dirt, precipitation, and road debris) when the trough 20, the first and second upper drain openings 24A, 24B, and the first and second lower drain openings 26A, 26B are included with trailer 1. As such, the first reverse signaling device 60 and the second turn signaling device 62 are sealed and protected from being hindered by dirt, precipitation and/or other debris that enters into the exterior chamber at the first and second upper drain openings 24A, 24B or the first and second lower drain openings 26A, 26B.

It should be appreciated that while the first reverse signaling device 60 and the second reverse signaling device 62 are configured to signal the trailer 1 and the vehicle 2 are traveling in reverse relative to the longitudinal direction of trailer 1, other signaling devices of rear lighting assembly 50 may be used to signal such reverse traveling. In one instance, the first turn signaling device 52 and the second turn signaling device 54 may be configured to signal that the trailer 1 and the vehicle 2 are traveling in reverse relative to the longitudinal direction of trailer 1 in conjunction with the first reverse signaling device 60 and the second reverse signaling device 62. In this instance, the first turn signaling device 52 and the second turn signaling device 54 may emit a different hue indicator or color of light (i.e., emitting a white light to signal a reverse direction) to signal and/or indicate that the trailer 1 and the vehicle 2 are traveling in reverse relative to the longitudinal direction of trailer 1. In another instance, the first reverse signaling device 60 and the second reverse signaling device 62 may be omitted and the first turn signaling device 52 and the second turn signaling device 54 may be configured to signal that the trailer 1 and the vehicle 2 are traveling in reverse relative to the longitudinal direction of trailer 1. In this instance, the first turn signaling device 52 and the second turn signaling device 54 may emit a different hue indicator or color of light (i.e., emitting white light to signal a reverse direction) to signal and/or indicate that the trailer 1 and the vehicle 2 are traveling in reverse relative to the longitudinal direction of trailer 1.

It should be appreciated that each of the first turn signaling device 52, the second turn signaling device 54, the set of first auxiliary signaling devices 56, the set of second auxiliary signaling devices 58, the first reverse signaling device 60, and the second reverse signaling device 62 may be any suitable device that is configured to emit light for signaling the driving states or the directions of travel for trailer 1. In one exemplary embodiment, each of the first turn signaling device 52, the second turn signaling device 54, the set of first auxiliary signaling devices 56, the set of second auxiliary signaling devices 58, the first reverse signaling device 60, and the second reverse signaling device 62 may be light emitting diodes (LEDs) that are configured to emit light for signaling the driving states or the directions of travel for trailer 1.

Rear lighting assembly 50 may also include a controller 64. As best seen in FIG. 4, controller 64 is electrically connected with each of the first turn signaling device 52, the second turn signaling device 54, the set of first auxiliary signaling devices 56, the set of second auxiliary signaling devices 58, the first reverse signaling device 60, and the second reverse signaling device 62 by a main electrical connection 66. In the present disclosure, the main electrical connection 66 is split into a first electrical connection 66A that electrically connects the first turn signaling device 52 with the controller 64, a second electrical connection 66B that electrically connects the second turn signaling device 54 with the controller 64, a third electrical connection 66C that electrically connects the set of first auxiliary signaling devices 56 with the controller 64, a fourth electrical connection 66D that electrically connects the set of second auxiliary signaling devices 58 with the controller 64, a fifth electrical connection 66E that electrically connects the first reverse signaling device 60 with the controller 264, and a sixth electrical connection 266F that electrically connects the second reverse signaling device 262 with the controller 264. Such electrical connections enables the controller 264 to operate and command one or more of the first turn signaling device 252, the second turn signaling device 254, the set of first auxiliary signaling devices 256, the set of second auxiliary signaling devices 258, the first reverse signaling device 260, and the second reverse signaling device 262 to emit signal lights when initiated by driver of vehicle 2.

In the present disclosure, controller 64 is configured to output one or more signals, via the set of electrical connections 66, to one or more of the first turn signaling device 52, the second turn signaling device 54, the set of first auxiliary signaling devices 56, the set of second auxiliary signaling devices 58, the first reverse signaling device 60, and the second reverse signaling device 62 in response to receiving one or more actions by the driver of vehicle 2. In one example, controller 64 may be provided with trailer 1 and electrically connects with a computer or processing unit of the vehicle 2 to enabling signaling and/or indication of the driving states or directions of travel of the trailer 1 based on one or more actions made by the driver of vehicle 2. In this instance, a second wiring harness 70 (see FIG. 4) may be used to electrically connect the controller 64 with the computer or processing unit of the vehicle 2 to enable electrical communication. In another example, controller 64 may be a computer or processing unit of the vehicle 2 that enables signaling and/or indication of the driving state or direction of travel of the trailer 1 based on one or more actions made by the driver of vehicle 2. In this instance, a wiring harness or electrical connection may be used to electrically connect each of the first turn signaling device 52, the second turn signaling device 54, the set of first auxiliary signaling devices 56, the set of second auxiliary signaling devices 58, the first reverse signaling device 60, and the second reverse signaling device 62 with the controller 64 to enable electrical communication.

Rear lighting assembly 50 may also include a power source 68 that operably engages with the controller 64 by an electrical connection 69. In the present disclosure, the power source 68 is located with trailer 1 to provide electrical power to the first turn signaling device 52, the second turn signaling device 54, the set of first auxiliary signaling devices 56, the set of second auxiliary signaling devices 58, the first reverse signaling device 60, and the second reverse signaling device 62, and the controller 64. In this instance, power source 68 may be a battery or similar device that is capable of storing and outputting electrical energy. In one alternative embodiment, power source 68 may also be at least one battery or electrical storage device that is provide with or preexists on vehicle 2 that provides electrical power to the first turn signaling device 52, the second turn signaling device 54, the set of first auxiliary signaling devices 56, the set of second auxiliary signaling devices 58, the first reverse signaling device 60, the second reverse signaling device 62, and the controller 64.

Having now described the components and devices of trailer 1 that includes rear lighting assembly 50, methods of using the rear lighting assembly 50 when towing trailer 1 with vehicle 2 are described in greater detail below.

Prior to using rear lighting assembly 50, the driver of vehicle 2 mechanically engages the trailer 1 with the vehicle 2 for towing capabilities. Once engaged, the driver of vehicle 2 may then electrically connect the trailer 1 with the vehicle 2 via one or more wiring harnesses 70 provided with trailer 1 to electrically connect the rear lighting assembly 50 with the vehicle 2. Particularly, the driver of vehicle 2 may connect the wiring harness 70 of trailer 1 with a computer or processing unit of vehicle 2 of vehicle 2. Once connected, the rear lighting assembly 50 and the vehicle 2 may then communicate with one another to enable the rear lighting assembly 50 to indicate the driving states or directions of travel of the trailer 1 and the vehicle 2. During operation, the rear lighting assembly 50 indicates various lights to drivers and pedestrians of the driving states or directions of travel of the trailer 1 along the entire rear end 1B of trailer 1. Various lights emitted by the rear lighting assembly 50 through the false bulkhead 40 to indicate the driving states or directions of travel of the trailer 1 are discussed below.

Figure 5A:
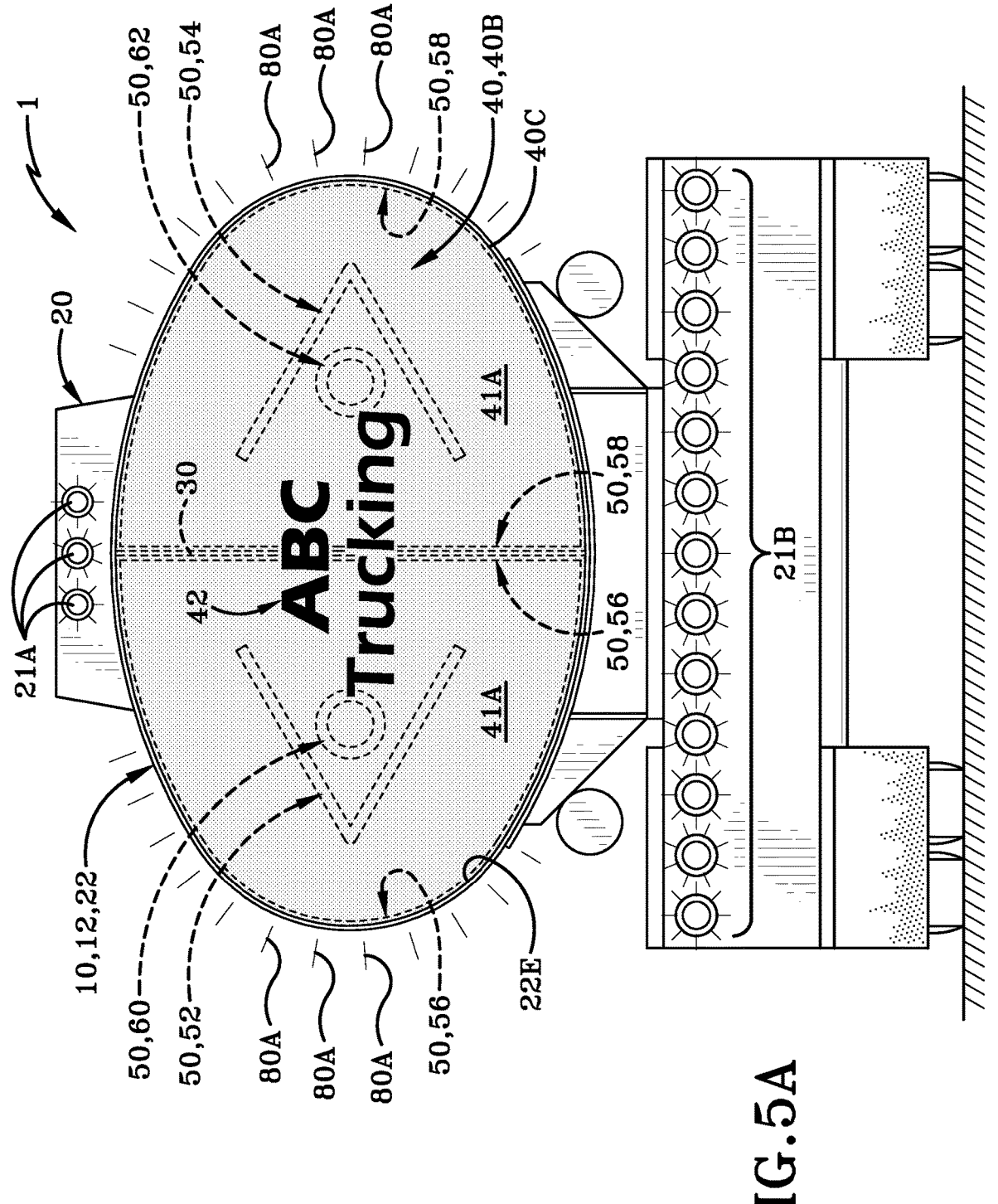
FIG. 5A is an operational view of the trailer equipped with the false bulkhead shown in FIG. 3B, wherein at least two signaling device of the rear lighting assembly emit a running light signal through the false bulkhead.

In a first instance, rear lighting assembly 50 may emit a first indicator light 80A through the false bulkhead 40 to indicate running lights for trailer 1. As best seen in FIGS. 5A and 7A, controller 64 may command each of the first turn signaling device 52 and the second turn signaling device 54 to emit the first indicator light 80A through the false bulkhead 40 to indicate running lights for trailer 1. In this instance, the first indicator light 80A is emitted at a first brightness for indicating running lights for trailer 1. Controller 64 may only command each of the first turn signaling device 52 and the second turn signaling device 54 to emit the first indicator light 80A through the false bulkhead 40 when headlights of vehicle 2 are activated by the driver for various reasons, including lack of visibility due to darkness or precipitation experienced by the trailer 1 and vehicle 2. Additionally, the graphics 42 provided on the outer surface 40B of false bulkhead 40 may also be illuminated when each of the first turn signaling device 52 and the second turn signaling device 54 emit the first indicator light 80A through the false bulkhead 40 to indicate running lights for trailer 1; such illumination of the false bulkhead 40 is denoted by shading labeled 41A in FIG. 5A.

In the first instance, it should be appreciated that controller 64 may also command the set of first auxiliary signaling devices 56 and the set of second auxiliary signaling devices 58 to emit the first indicator light 80A in conjunction with the first turn signaling device 52 and the second turn signaling device 54 to indicate running lights for trailer 1. As such, the controller 64 may command each of the first turn signaling device 52, the second turn signaling device 54, the set of first auxiliary signaling devices 56, and the set of second auxiliary signaling devices 58 to emit the first indicator light 80A through the false bulkhead 40 to indicate running lights for trailer 1. Such light emission by the set of first auxiliary signaling devices 56 and the set of second auxiliary signaling devices 58 enables greater illumination through the false bulkhead 40 to indicate running lights of trailer 1.

Figure 5B:
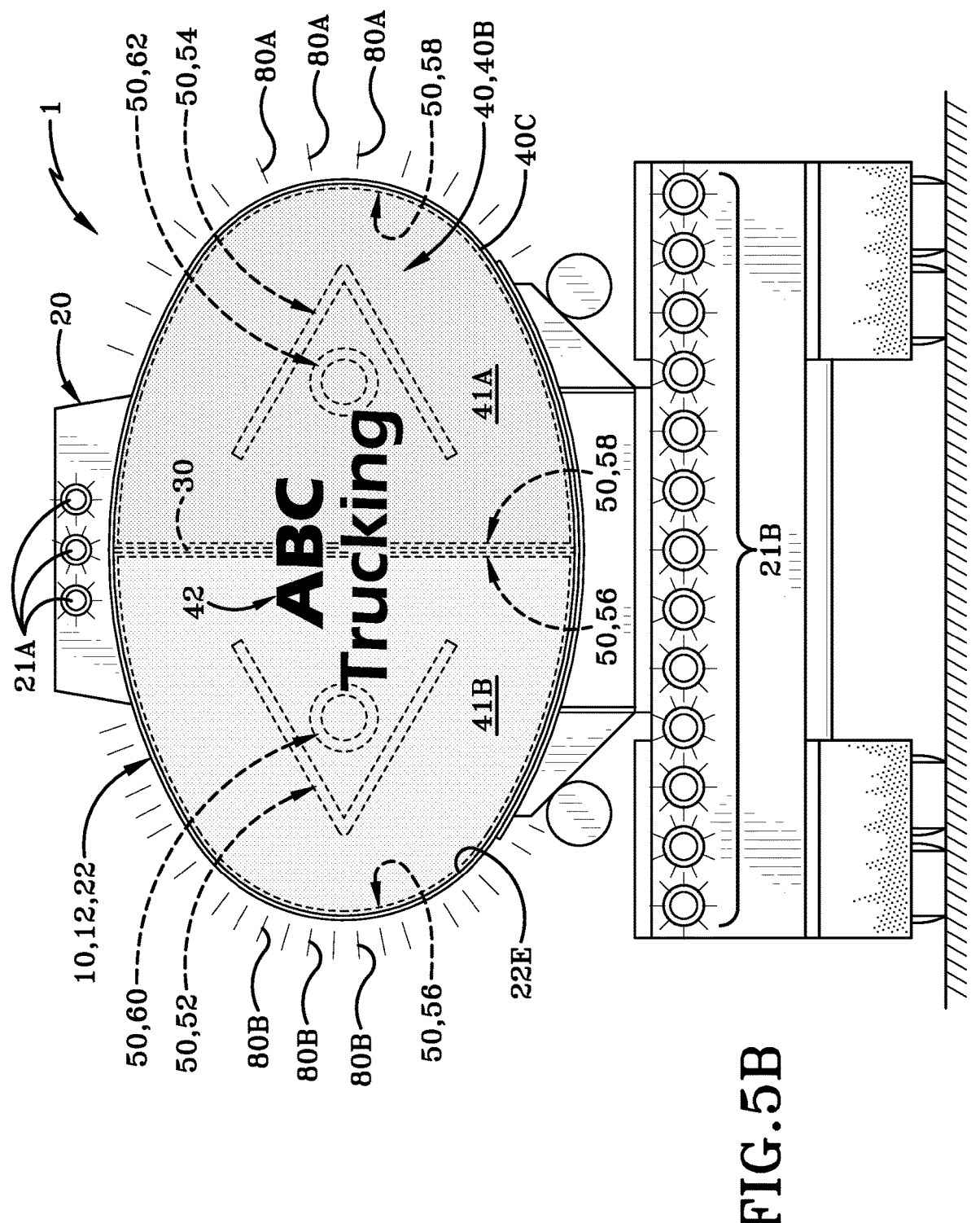
FIG. 5B is another operational view of the trailer equipped with the false bulkhead shown in FIG. 3B, but a first signaling device of the rear lighting assembly emits a first turning indicator light to indicate a first direction of travel for the trailer.

In a second instance, rear lighting assembly 50 may emit a second indicator light 80B through the false bulkhead 40 to indicate a first turning direction or first lateral direction of the trailer 1 and vehicle 2 relative to the longitudinal direction of trailer 1. As best seen in FIGS. 5B and 7B, controller 64 may command the first turn signaling device 52 to emit the second indicator light 80B inside of the first compartment 44A and through the false bulkhead 40 to indicate the first turning direction or first lateral direction of the trailer 1 and vehicle 2 relative to the longitudinal direction of trailer 1. In this instance, the second indicator light 80B is emitted at a second brightness that is greater than the first brightness at the first indicator light 80A. Controller 64 may only command the first turn signaling device 52 to emit the second indicator light 80B through the false bulkhead 40 when driver desires to signal that the trailer 1 and vehicle 2 are traveling in the first turning direction or first lateral direction relative to the longitudinal direction of trailer 1; such illumination of a first portion of the false bulkhead 40 is denoted by shading labeled 41B in FIG. 5B. While not illustrated herein, controller 64 may only command the first turn signaling device 52, while leaving the second turn signaling device 54 in an OFF state, to emit the second indicator light 80B through the false bulkhead 40 when driver desires to signal that the trailer 1 and vehicle 2 are traveling in the first turning direction or first lateral direction relative to the longitudinal direction of trailer 1.

In the second instance, it should be appreciated that controller 64 may also command the set of first auxiliary signaling devices 56 to emit the second indicator light 80B to indicate the first turning direction of the trailer 1 and vehicle 2 relative to the longitudinal direction of trailer 1. As such, the controller 64 may command each of the first turn signaling device 52 and the set of first auxiliary signaling devices 56 to emit the second indicator light 80B inside of the first compartment 44A and through the false bulkhead 40 to indicate the first turning direction or first lateral direction of the trailer 1 and vehicle 2 relative to the longitudinal direction of trailer 1. Such light emission by the set of first auxiliary signaling devices 56, in conjunction with the first turn signaling device 52, enables greater illumination through the false bulkhead 40 to indicate the first turning direction to pedestrians and drivers that are positioned behind of the rear end 1B of trailer 1.

In the second instance, it should also be appreciated that controller 64 may also command the first turn signaling device 52 and the set of first auxiliary signaling devices 56 to emit a series of second indicator lights 80B to indicate the first turning direction of the trailer 1 and vehicle 2 relative to the longitudinal direction of trailer 1. Stated differently, controller 64 may command the first turn signaling device 52 and the set of first auxiliary signaling devices 56 to periodically emit or flash the second indicator light 80B to indicate the turning direction to pedestrians and drivers that are positioned behind the rear end 1B of trailer 1.

In the second instance, one or more of the brake lights of the exterior lights 21B below the false bulkhead 40 may emit and flash lights to indicate the first turning direction of the trailer 1 and the vehicle 2. In one instance, two or more brake lights of the exterior lights 21B proximate to the first turn signaling device 52 and the set of first auxiliary signaling lights 56 may be commanded to emit and flash lights to indicate the first turning direction of the trailer 1 and the vehicle 2 in concert with the first turn signaling device 52 and the set of first auxiliary signaling lights 56.

Figure 5C:
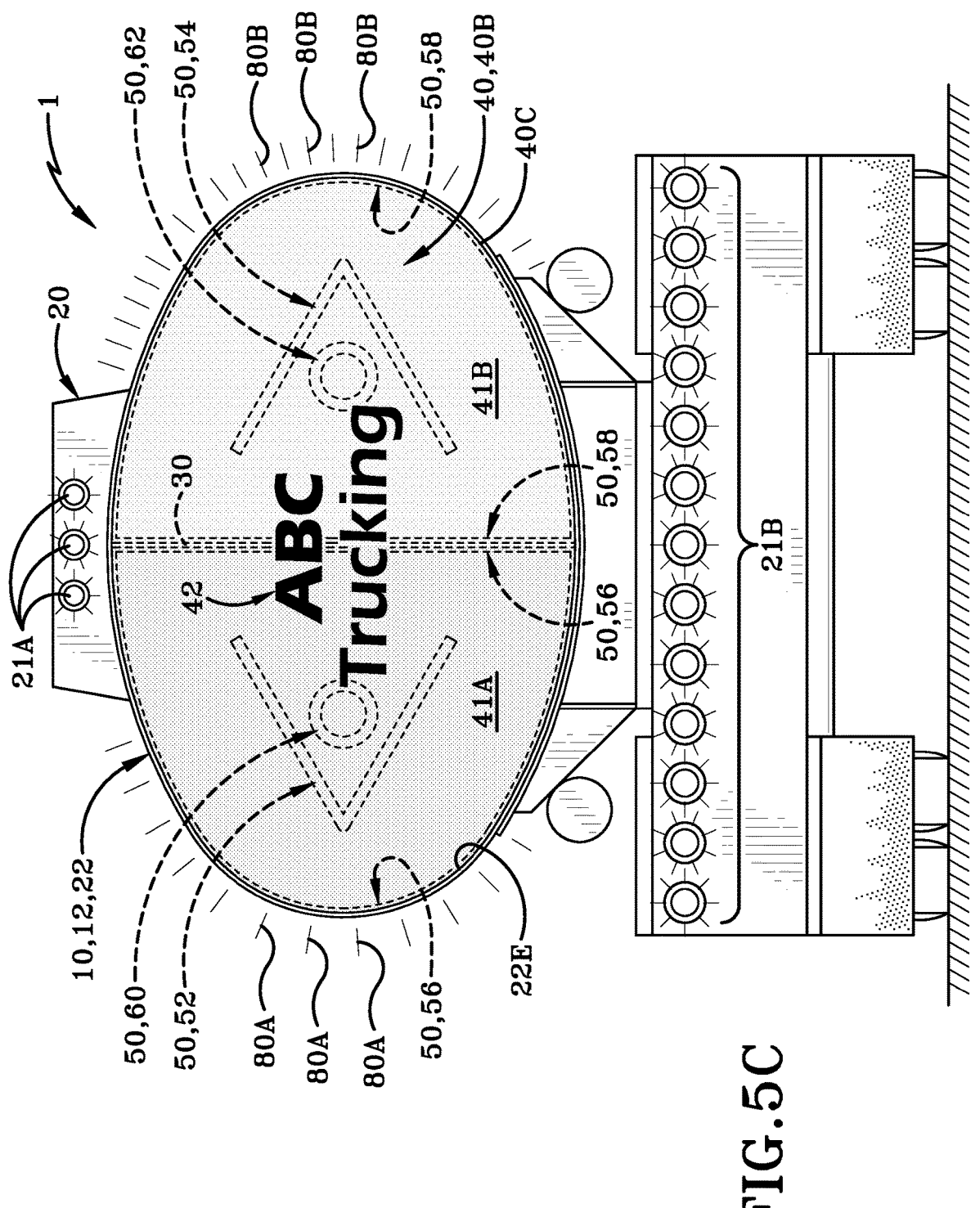
FIG. 5C is another operational view of the trailer equipped with the false bulkhead shown in FIG. 3B, but a second signaling device of the rear lighting assembly emits a second turning indicator light to indicate a second direction of travel for the trailer.

In a third instance, similar to the second instance, rear lighting assembly 50 may emit a third indicator light 80B through the false bulkhead 40 to indicate a second turning direction or second lateral direction of the trailer 1 and vehicle 2 relative to the longitudinal direction of trailer 1; the second turning direction is opposite to the first turning direction shown in FIGS. 5B and 7B. As best seen in FIGS. 5C and 7C, controller 64 may command the second turn signaling device 54 to emit the third indicator light 80B inside of the second compartment 44B and through the false bulkhead 40 to indicate the second turning direction or second lateral direction of the trailer 1 and vehicle 2 relative to the longitudinal direction of trailer 1; such illumination of a second portion of the false bulkhead 40 is denoted by shading labeled 41B in FIG. 5C. In this instance, the third indicator light 80B is emitted at a third brightness that is greater than the first brightness of the first indicator light 80A and equal to the second brightness of the second indicator light 80B. Controller 64 may only command the second turn signaling device 54 to emit the third indicator light 80B through the false bulkhead 40 when the driver desires to signal that the trailer 1 and vehicle 2 are traveling in the second turning direction or second lateral direction relative to the longitudinal direction of trailer 1. While not illustrated herein, controller 64 may only command the second turn signaling device 54, while leaving the first turn signaling device 52 in an OFF state, to emit the third indicator light 80B through the false bulkhead 40 when driver desires to signal that the trailer 1 and vehicle 2 are traveling in the second turning direction or second lateral direction relative to the longitudinal direction of trailer 1.

In the third instance, it should be appreciated that controller 64 may also command the set of second auxiliary signaling devices 58 to emit the third indicator light 80B to indicate the second turning direction of the trailer 1 and vehicle 2 relative to the longitudinal direction of trailer 1. As such, the controller 64 may command each of the second turn signaling device 54 and the set of second auxiliary signaling devices 58 to emit the third indicator light 80B inside of the second compartment 44B and through the false bulkhead 40 to indicate the second turning direction or second lateral direction of the trailer 1 and vehicle 2 relative to the longitudinal direction of trailer 1. Such light emission by the set of second auxiliary signaling devices 58, in conjunction with the second turn signaling device 54, enables greater illumination through the false bulkhead 40 to indicate the turning direction to pedestrians and drivers that are positioned behind of the rear end 1B of trailer 1.

In the third instance, it should also be appreciated that controller 64 may also command the second turn signaling device 54 and the set of second auxiliary signaling devices 58 to emit a series of third indicator lights 80B to indicate the second turning direction of the trailer 1 and vehicle 2 relative to the longitudinal direction of trailer 1. Stated differently, controller 64 may command the second turn signaling device 54 and the set of second auxiliary signaling devices 58 to periodically emit or flash the third indicator light 80B to indicate the turning direction to pedestrians and drivers that are positioned behind the rear end 1B of trailer 1.

In the third instance, one or more of the brake lights of the exterior lights 21B below the false bulkhead 40 may emit and flash lights to indicate the second turning direction of the trailer 1 and the vehicle 2. In one instance, two or more brake lights of the exterior lights 21B proximate to the second turn signaling device 54 and the set of second auxiliary signaling lights 58 may be commanded to emit and flash lights to indicate the second turning direction of the trailer 1 and the vehicle 2 in concert with the second turn signaling device 54 and the set of second auxiliary signaling lights 58.

Figure 5D:
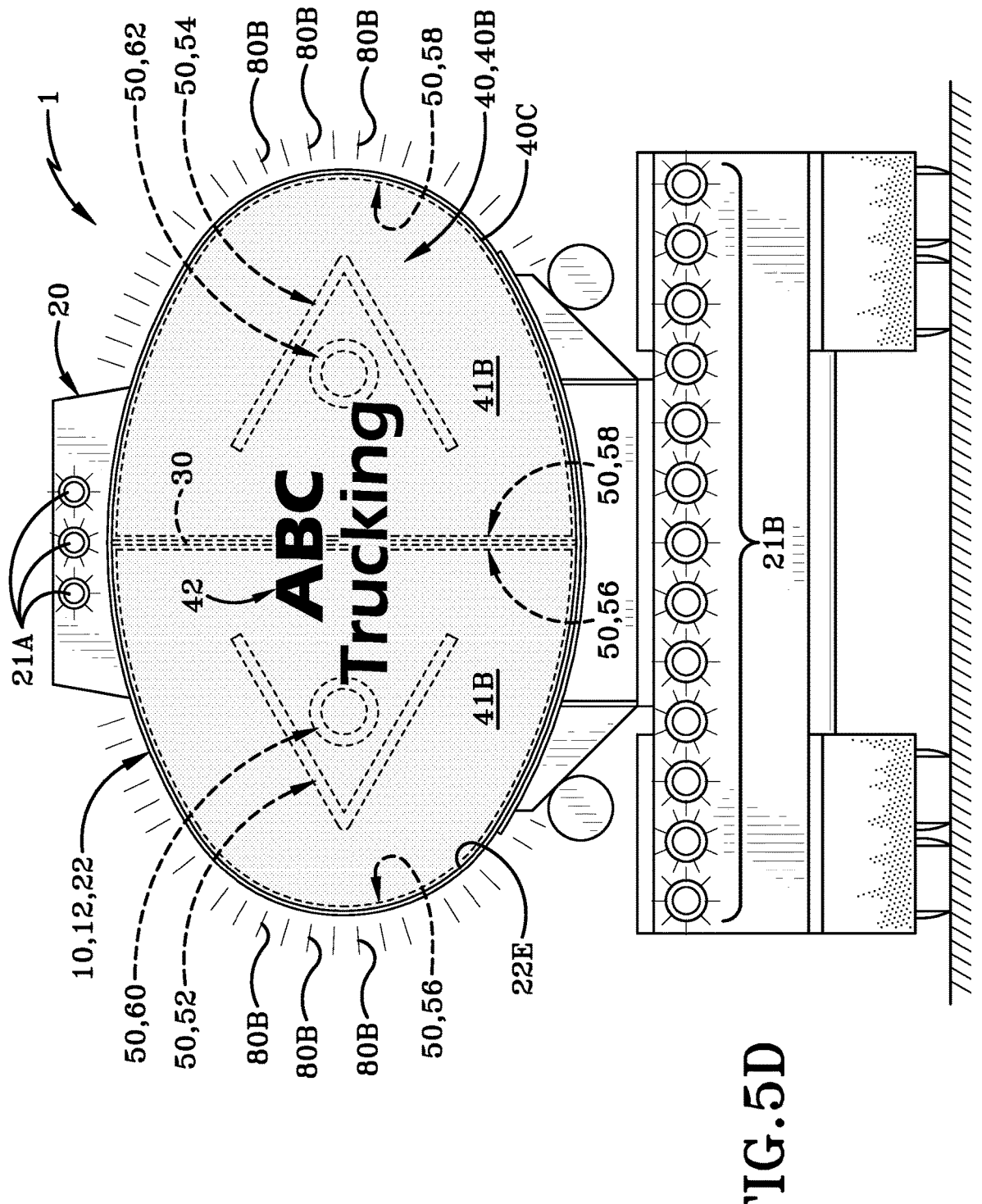
FIG. 5D is another operational view of the trailer equipped with the false bulkhead shown in FIG. 3B, but both the first and second signaling devices of the rear lighting assembly emits a braking indicator light to indicate a braking or deceleration of the trailer.

In a fourth instance, rear lighting assembly 50 may emit a fourth indicator light 80B through the false bulkhead 40 to indicate braking and/or deceleration of the trailer 1 and vehicle 2 in a first longitudinal direction relative to the longitudinal direction of trailer 1. As best seen in FIGS. 5D and 7D, controller 64 may command each of the first turn signaling device 52 and second turn signaling device 54 to emit the fourth indicator light 80B simultaneously through the false bulkhead 40 to indicate the braking and/or deceleration of the trailer 1 and vehicle 2 relative to the longitudinal direction of trailer 1; such illumination of first and second portions of the false bulkhead 40 is denoted by shading labeled 41B in FIG. 5D. In this instance, the fourth indicator light 80B is emitted at a fourth brightness that is greater than the first brightness of the first indicator light 80A and equal to the second brightness of the second indicator light 80B and the third brightness of the third indicator light 80B. Controller 64 may only command the first turn signaling device 52 and second turn signaling device 54 to emit the fourth indicator light 80B through the false bulkhead 40 when the driver initiates a braking action when driving the vehicle 2 to signal that the trailer 1 and vehicle 2 are braking and/or decelerating in the first longitudinal direction relative to the longitudinal direction of trailer 1.

In the fourth instance, it should be appreciated that controller 64 may also command the set of first auxiliary signaling devices 56 and the set of second auxiliary signaling devices 58 to emit the fourth indicator light 80B, in conjunction with the first turn signaling device 52 and the second turn signaling device 54, to indicate braking and/or deceleration of the trailer 1 and vehicle 2 in the first longitudinal direction relative to the longitudinal direction of trailer 1. As such, the controller 64 may command each of the first turn signaling device 52, the second turn signaling device 54, the set of first auxiliary signaling devices 56, and the set of second auxiliary signaling devices 58 to emit the fourth indicator light 80B through the false bulkhead 40 to indicate braking and/or deceleration of the trailer 1 and vehicle 2 in the first longitudinal direction relative to the longitudinal direction of trailer 1. Such light emission by the set of first auxiliary signaling devices 56 and the set of second auxiliary signaling devices 58 enables greater illumination through the false bulkhead 40 to indicate the braking of the trailer 1 and vehicle 2 to pedestrians and drivers that are positioned behind the rear end 1B of trailer 1.

In the fourth instance, one or more of the brake lights of the exterior lights 21A, 21B above and below the false bulkhead 40 may emit lights to indicate the braking or deceleration of the trailer 1 and the vehicle 2. In one instance, all exterior lights 21A, 21B emit lights to indicate the braking or deceleration of the trailer 1 and the vehicle 2 in concert with the first turn signaling device 52, the second turn signaling device 54, the set of first auxiliary signaling lights 56, and the set of second auxiliary signaling lights 58.

Figure 5E:
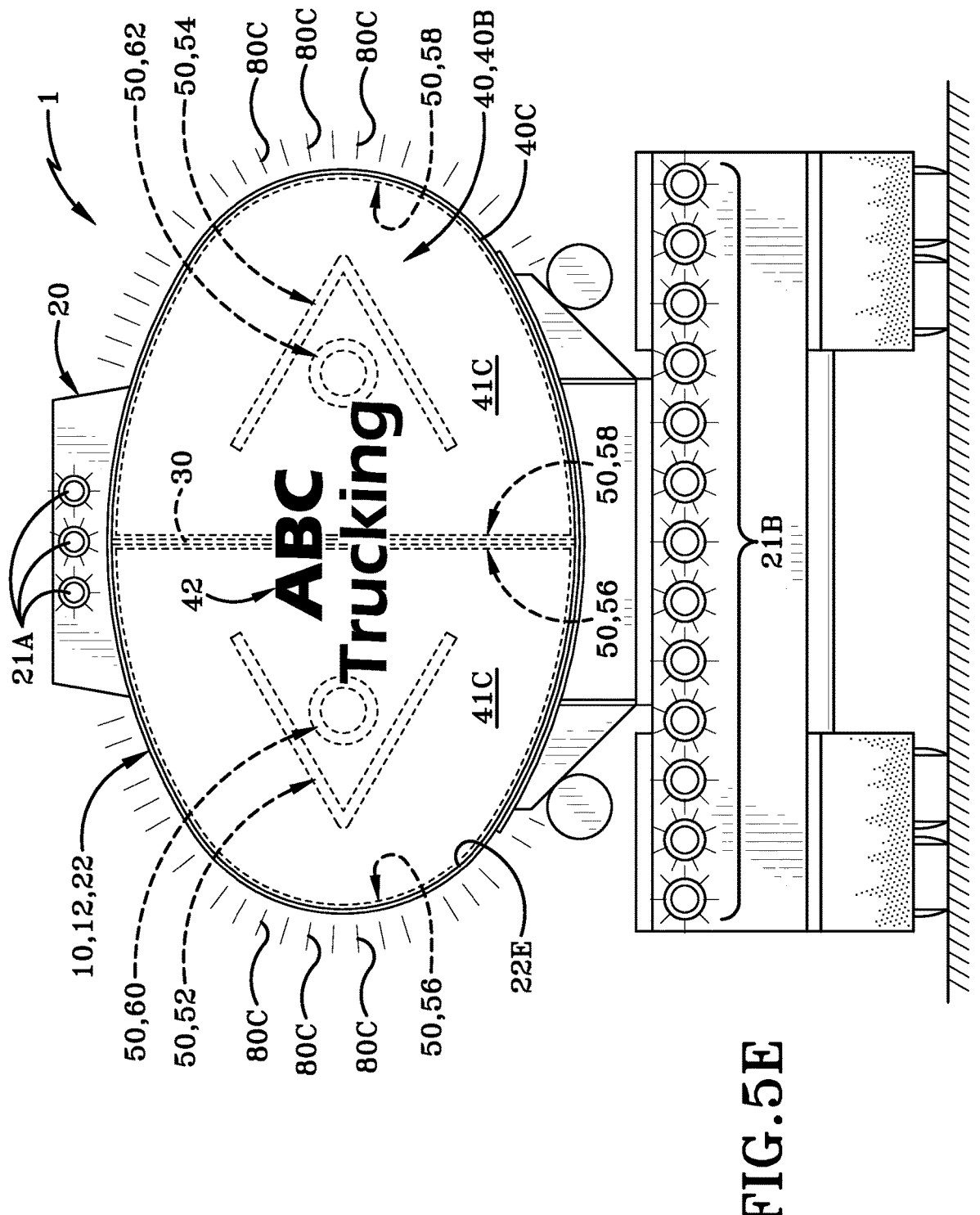
FIG. 5E is another operational view of the trailer equipped with the false bulkhead shown in FIG. 3B, but at least two reverse signaling device of the rear lighting assembly emit reverse light signals through the false bulkhead.

In a fifth instance, rear lighting assembly 50 may emit a fifth indicator light 80C through the false bulkhead 40 to indicate a reversing of the trailer 1 and vehicle 2 in a second longitudinal direction relative to the longitudinal direction of trailer 1; the second longitudinal direction is opposite to the first longitudinal direction. As best seen in FIGS. 5E and 7E, controller 64 may command each of the first reverse signaling device 60 and second reverse signaling device 62 to emit the fifth indicator light 80C simultaneously through the false bulkhead 40 to indicate the second longitudinal direction of the trailer 1 and vehicle 2 relative to the longitudinal direction of trailer 1; such illumination of first and second portions of the false bulkhead 40 is denoted by shading labeled 41C in FIG. 5E. In this instance, the fifth indicator light 80C is emitted at a fifth brightness that is greater than the first brightness of the first indicator light 80A and equal to the second brightness of the second indicator light 80B, the third brightness of the third indicator light 80B, and the fourth brightness of the fourth indicator light 80B. Controller 64 may command the first reverse signaling device 60 and second reverse signaling device 62 to emit the fifth indicator light 80C through the false bulkhead 40 when the driver provides the vehicle 2 in a reverse gear so that the trailer 1 and vehicle 2 travel in reverse and/or in the second longitudinal direction.

While not illustrated herein, rear lighting assembly 50 may emit a sixth indicator light through the false bulkhead 40 to indicate traffic hazards experienced by trailer 1 and vehicle 2. In this instance, controller 64 may command each of the first turn signaling device 52 and second turn signaling device 54 the sixth indicator light simultaneously through the false bulkhead 40 to indicate traffic hazards experienced by trailer 1 and vehicle 2. In this instance, the sixth indicator light would be emitted at a sixth brightness that is greater than the first brightness of the first indicator light 80A and equal to the second brightness of the second indicator light 80B, the third brightness of the third indicator light 80B, and the fourth brightness of the fourth indicator light 80B. It should be understood that the sixth indicator light emitted by the first turn signaling device 52 and second turn signaling device 54 are substantially similar to the second indicator light 80B and the third indicator light 80B. Controller 64 may only command the first turn signaling device 52 and second turn signaling device 54 to emit the sixth indicator light through the false bulkhead 40 when the driver actuates a traffic hazards feature inside of vehicle 2.

In the sixth instance, it should be appreciated that controller 64 may also command the set of first auxiliary signaling devices 56 and the set of second auxiliary signaling devices 58 to emit the sixth indicator light, in conjunction with the first turn signaling device 52 and the second turn signaling device 54, to indicate traffic hazards experienced by trailer 1 and vehicle 2. As such, the controller 64 may command each of the first turn signaling device 52, the second turn signaling device 54, the set of first auxiliary signaling devices 56, and the set of second auxiliary signaling devices 58 to emit the sixth indicator light through the false bulkhead 40 to indicate traffic hazards experienced by trailer 1 and vehicle 2. Such light emission by the set of first auxiliary signaling devices 56 and the set of second auxiliary signaling devices 58 enables greater illumination through the false bulkhead 40 to indicate the traffic hazards experienced by trailer 1 and vehicle 2.

Figure 8:
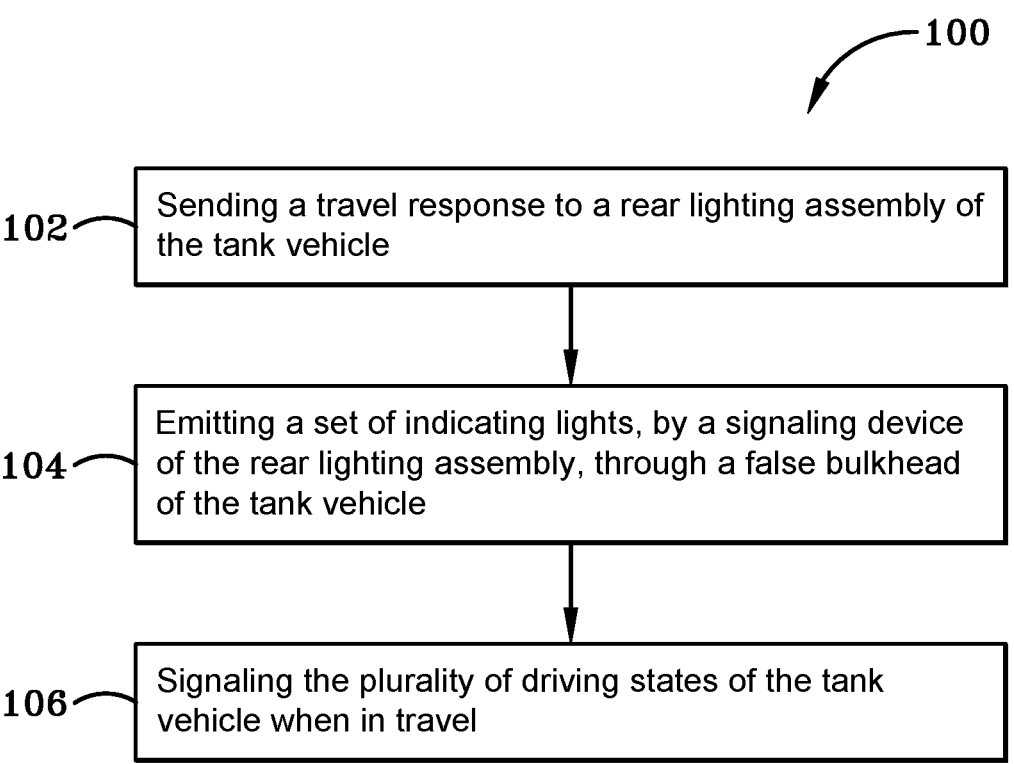
FIG. 8 is an exemplary method flowchart.

FIG. 8 is a method 100 of signaling a plurality of driving states of a tank vehicle when in travel. An initial step 102 of method 100 includes sending a travel response to a rear lighting assembly of the tank vehicle. Another step 104 of method 100 includes emitting a set of indicating lights, by a signaling device of the rear lighting assembly, through a false bulkhead of the tank vehicle. Another step 106 of method 100 includes signaling the plurality of driving states of the tank vehicle when in travel.

Optional and/or additional steps may be further included in method 100 for signaling a plurality of driving states of a tank vehicle when in travel. An optional step may include that the step of emitting the set of indicating lights through the false bulkhead further includes that the set of indicating lights is transmitted through the false bulkhead free from obstructing a view of the signaling device. An optional step may include that the step of emitting the set of indicating lights through the false bulkhead further includes that the set of indicating lights is diffused through the false bulkhead to obstruct a view of the signaling device. An optional step may further include reflecting at least one indicating light of the set of indicating lights, by a rear bulkhead of the tank vehicle, towards the false bulkhead. Optional steps may include emitting a series of first turn indicating lights of the set of indicating lights, by the signaling device, through the false bulkhead; and signaling a first turning state of the plurality of driving states of the tank vehicle. Optional steps may include emitting a series of second turn indicating lights of the set of indicating lights, by the signaling device, through the false bulkhead; and signaling a second turning state of the plurality of driving states of the tank vehicle; wherein the second turning state is opposite to the first turning state. Optional steps may include emitting a braking indicating light of the set of indicating lights, by the signaling device, through the false bulkhead of the tank vehicle; and signaling a braking state of the plurality of driving states of the tank vehicle when in travel. Optional steps may include emitting a reversing indicating light of the set of indicating lights, by the signaling device, through the false bulkhead of the tank vehicle; and signaling a reversing state of the plurality of driving states of the tank vehicle when in travel. Optional steps may include emitting a series of first turn indicating lights of the set of indicating lights, by the signaling device, through the false bulkhead; emitting a series of second turn indicating lights of the set of indicating lights, by the signaling device, through the false bulkhead; and signaling a hazard state of the plurality of driving states of the tank vehicle when in travel. Optional steps may include emitting a running indicating light of the set of indicating lights, by the signaling device, through the false bulkhead of the tank vehicle; and signaling a running state of the plurality of driving states of the tank vehicle when in travel.

As described herein, aspects of the present disclosure may include one or more electrical, pneumatic, hydraulic, or other similar secondary components and/or systems therein.

The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of document word submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A method of signaling a plurality of driving states of a tank vehicle when in travel, comprising:

sending a travel response to a rear lighting assembly of the tank vehicle;

emitting a set of indicating lights, by a signaling device of the rear lighting assembly, through a false bulkhead of the tank vehicle; and signaling the plurality of driving states of the tank vehicle when in travel.

2. The method of claim 1, wherein the step of emitting the set of indicating lights through the false bulkhead further includes that the set of indicating lights is transmitted through the false bulkhead free from obstructing a view of the signaling device.

3. The method of claim 1, wherein the step of emitting the set of indicating lights through the false bulkhead further includes that the set of indicating lights is diffused through the false bulkhead to obstruct a view of the signaling device.

4. The method of claim 1, further comprising:
reflecting at least one indicating light of the set of indicating lights, by a rear bulkhead of the tank vehicle, towards the false bulkhead.

5. The method of claim 1, further comprising:
emitting a series of first turn indicating lights of the set of indicating lights, by the signaling device, through the false bulkhead; and
signaling a first turning state of the plurality of driving states of the tank vehicle.

6. The method of claim 5, further comprising;
emitting a series of second turn indicating lights of the set of indicating lights, by the signaling device, through the false bulkhead; and
signaling a second turning state of the plurality of driving states of the tank vehicle;
wherein the second turning state is opposite to the first turning state.

7. The method of claim 1, further comprising:
emitting a braking indicating light of the set of indicating lights, by the signaling device, through the false bulkhead of the tank vehicle; and
signaling a braking state of the plurality of driving states of the tank vehicle when in travel.

8. The method of claim 1, further comprising:
emitting a reversing indicating light of the set of indicating lights, by the signaling device, through the false bulkhead of the tank vehicle; and
signaling a reversing state of the plurality of driving states of the tank vehicle when in travel.

9. The method of claim 1, further comprising:
emitting a series of first turn indicating lights of the set of indicating lights, by the signaling device, through the false bulkhead;
emitting a series of second turn indicating lights of the set of indicating lights, by the signaling device, through the false bulkhead; and
signaling a hazard state of the plurality of driving states of the tank vehicle when in travel.

10. The method of claim 1, further comprising:
emitting a running indicating light of the set of indicating lights, by the signaling device, through the false bulkhead of the tank vehicle; and
signaling a running state of the plurality of driving states of the tank vehicle when in travel.

11. A method of signaling a plurality of driving states of a tank vehicle when in travel, comprising:
sending a travel response to a rear lighting assembly of the tank vehicle;
emitting a set of indicating lights, by a pair of signaling devices of the rear lighting assembly, inside a first compartment of the tank vehicle or a second compartment;
emitting the set of indicating lights, by the pair of signaling device of the rear lighting assembly, through a false bulkhead of the tank vehicle; and signaling the plurality of driving states of the tank vehicle when in travel.

12. The method of claim 11, further comprising:
emitting a series of first turn indicating lights of the set of indicating lights, by a first signaling device of the pair of signaling devices, inside of the first compartment and through a first portion of the false bulkhead; and
signaling a first turning state of the plurality of driving states of the tank vehicle.

13. The method of claim 12, further comprising;
emitting a series of second turn indicating lights of the set of indicating lights, by a second signaling device of the pair of signaling devices, inside of the second compartment and through a second portion of the false bulkhead; and
signaling a second turning state of the plurality of driving states of the tank vehicle;
wherein the second turning state is opposite to the first turning state.

14. The method of claim 13, further comprising:
emitting the series of first turn indicating lights of the set of indicating lights, by a set of first auxiliary signaling devices of the rear lighting assembly, inside of the first compartment and through the first portion of the false bulkhead; and
signaling the first turning state of the plurality of driving states of the tank vehicle;
wherein the series of first turn indicating lights is emitted simultaneously by the first signaling device and the set of first auxiliary signaling lights.

15. The method of claim 14, further comprising:
emitting the series of second turn indicating lights of the set of indicating lights, by a set of second auxiliary signaling devices of the rear lighting assembly, inside of the second compartment and through the second portion of the false bulkhead; and
signaling the second turning state of the plurality of driving states of the tank vehicle;
wherein the series of second turn indicating lights is emitted simultaneously by the second signaling device and the set of second auxiliary signaling lights.

16. The method of claim 11, further comprising:
emitting a first braking indicating light of the set of indicating lights, by a first signaling device of the pair of signaling devices, inside of the first compartment and through the false bulkhead of the tank vehicle;
emitting a second braking indicating light of the set of indicating lights, by a second signaling device of the pair of signaling devices, inside of the second compartment and through the false bulkhead of the tank vehicle; and
signaling a braking state of the plurality of driving states of the tank vehicle when in travel.

17. The method of claim 16, further comprising:
emitting the first braking indicating light of the set of indicating lights, by a set of first auxiliary signaling devices of the rear lighting assembly, inside of the first compartment and through the false bulkhead of the tank vehicle;
emitting the second braking indicating light of the set of indicating lights, by a set of second peripheral signaling devices of the rear lighting assembly, inside of the second compartment and through the false bulkhead of the tank vehicle; and
signaling the braking state of the plurality of driving states of the tank vehicle when in travel.

18. The method of claim 11, wherein the step of emitting the set of indicating lights through the false bulkhead further includes that the set of indicating lights is transmitted through the false bulkhead free from obstructing a view of the pair of signaling devices.

19. The method of claim 11, wherein the step of emitting the set of indicating lights through the false bulkhead further includes that the set of indicating lights is diffused through the false bulkhead to obstruct a view of the pair of signaling devices.

20. The method of claim 11, further comprising:

reflecting at least one indicating light of the set of indicating lights, by a rear bulkhead of the tank vehicle, towards the false bulkhead; and reflecting the at least one indicating light of the set of indicating lights, by a divider of the tank vehicle, towards the false bulkhead.

\* \* \* \* \*